United States Patent
Yokoyama

(10) Patent No.: US 9,665,317 B2
(45) Date of Patent: May 30, 2017

(54) IMAGE FORMING SYSTEM FOR EXCHANGING LOCATION AND PROCESSING INFORMATION OF A JOB USING SHORT-RANGE COMMUNICATION

(71) Applicant: CANON KABUSHIKI KAISHA, Tokyo (JP)

(72) Inventor: Toshihiro Yokoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 14/209,884

(22) Filed: Mar. 13, 2014

(65) Prior Publication Data

US 2014/0268209 A1 Sep. 18, 2014

(30) Foreign Application Priority Data

Mar. 15, 2013 (JP) ................. 2013-053602

(51) Int. Cl.
*G06F 3/12* (2006.01)
*H04N 1/00* (2006.01)

(52) U.S. Cl.
CPC ............ *G06F 3/121* (2013.01); *G06F 3/1234* (2013.01); *G06F 3/1261* (2013.01); *G06F 3/1291* (2013.01)

(58) Field of Classification Search
CPC ...... G06F 3/121; G06F 3/1234; G06F 3/1261; G06F 3/1291; G06F 3/1292; G06F 3/1293; H04N 1/00342
USPC ...................................... 358/1.16, 1.13–1.15
See application file for complete search history.

(56) References Cited

U.S. PATENT DOCUMENTS

| | | | | |
|---|---|---|---|---|
| 7,221,465 B1* | 5/2007 | Shimada | ............ | H04N 1/32502 |
| | | | | 358/1.14 |
| 7,258,498 B2* | 8/2007 | Hatta et al. | ..................... | 400/62 |
| 7,415,670 B2* | 8/2008 | Hull et al. | ..................... | 715/716 |
| 2003/0103236 A1* | 6/2003 | Kato | ........................... | 358/1.15 |
| 2004/0130748 A1* | 7/2004 | Hashimoto | .................. | 358/1.15 |
| 2006/0092433 A1* | 5/2006 | Stevens et al. | ................ | 358/1.1 |
| 2006/0183423 A1* | 8/2006 | Johansson et al. | ......... | 455/41.2 |
| 2007/0201084 A1* | 8/2007 | Tokumaru et al. | ......... | 358/1.15 |
| 2009/0066998 A1* | 3/2009 | Kato | ........................... | 358/1.15 |
| 2009/0103124 A1* | 4/2009 | Kimura et al. | ............. | 358/1.15 |
| 2011/0211218 A1* | 9/2011 | Gilmore | ................ | G06F 3/1207 |
| | | | | 358/1.15 |
| 2013/0027737 A1* | 1/2013 | Suzuki | ......................... | 358/1.14 |
| 2013/0229685 A1* | 9/2013 | Naruse | ......................... | 358/1.15 |
| 2013/0335772 A1* | 12/2013 | Waller et al. | ................ | 358/1.15 |
| 2014/0148098 A1* | 5/2014 | Song | ............................ | 455/41.1 |

FOREIGN PATENT DOCUMENTS

| | | |
|---|---|---|
| JP | 2000-259377 A | 9/2000 |
| JP | 2008-269298 A | 11/2008 |
| JP | 4265262 B2 | 5/2009 |
| JP | 2009-295054 A | 12/2009 |
| JP | 2010-005877 A | 1/2010 |
| JP | 2011-108147 A | 6/2011 |

(Continued)

*Primary Examiner* — Eric A Rust
(74) *Attorney, Agent, or Firm* — Canon USA Inc., IP Division

(57) ABSTRACT

A user touches an information processing apparatus with a contactless IC card, thereby storing information required for handing over a process in the card, and then touches, with the card, an information processing apparatus to which the process is to be handed over.

25 Claims, 24 Drawing Sheets

(56) References Cited

FOREIGN PATENT DOCUMENTS

| JP | 2011-255517 A | 12/2011 |
| JP | 2012-004757 A | 1/2012 |
| JP | 2012-250420 A | 12/2012 |

\* cited by examiner

PLEASE SELECT DOCUMENT OF
WHICH PRINTING IS TO BE RESUMED.

| DOCUMENT NAME | SAVE LOCATION | PRINT SETTINGS | ALREADY PRINTED PAGES |
|---|---|---|---|
| XXX | 192.168.0.2 | 2 in 1/TWO-SIDED | 4/19 |
| → YYY | 192.168.0.3 | 1 in 1/ONE-SIDED | 5/7 |
| ZZZ | 192.168.0.4 | 4 in 1/TWO-SIDED | 4/43 |

PLEASE SPECIFY PAGES TO BE
PRINTED BY ANOTHER MFP.

| DOCUMENT NAME | SAVE LOCATION | PRINT SETTINGS | ALREADY PRINTED PAGES |
|---|---|---|---|
| XXX | 192.168.0.2 | 2 in 1/TWO-SIDED | 4/19 |

| START PAGE | END PAGE |
|---|---|
| 5 | 12 |

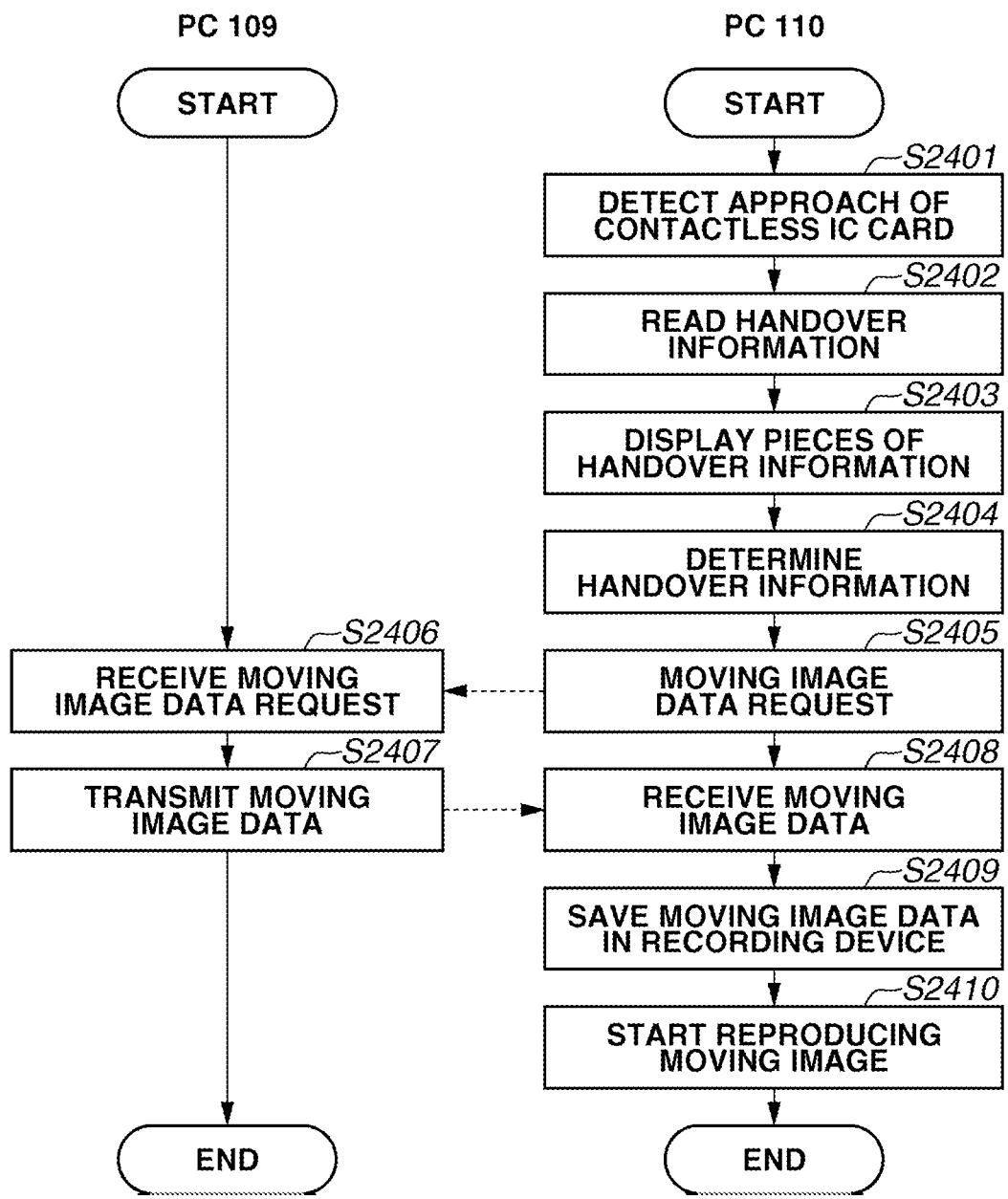

IMAGE FORMING SYSTEM FOR EXCHANGING LOCATION AND PROCESSING INFORMATION OF A JOB USING SHORT-RANGE COMMUNICATION

BACKGROUND

Field

Aspects of the present invention generally relate to an information processing apparatus and an information processing terminal that have the function of transmitting and receiving information using short-range wireless communication, and relates to a method of controlling the same.

Description of the Related Art

If an error has occurred in a print job submitted from an information processing terminal to a multifunction printer (MFP), printing may not be resumed immediately. In such a case, a user needs to wait for the error to be resolved, or needs to submit a print job from the information processing terminal to another MFP anew, which is troublesome. As a method for resolving this problem, a technique is known in which if an error has occurred, an information processing terminal inquires of an alternative print management apparatus and re-transmits a print job to a designated MFP (Japanese Patent No. 4265262). Further, there is a technique in which an information processing apparatus sets the priority order of MFPs in advance, and if an error has occurred, re-transmits a print job to an MFP having the next priority (Japanese Patent Application Laid-Open No. 2000-259377).

In the technique discussed in the publication of Japanese Patent No. 4265262, however, an alternative print management apparatus is required, and additionally, the user cannot select an MFP to be used as an alternative. Further, in the technique discussed in the publication of Japanese Patent Application Laid-Open No. 2000-259377, it is necessary to set the priority order of MFPs in advance, which is troublesome to the user. As described above, it may be difficult for a user to intuitively hand over a job to be performed by an information processing apparatus.

SUMMARY

According to an aspect of the present invention, an information processing apparatus includes a generation unit configured to generate handover information including position information indicating a saving location of data that is being processed, progress information indicating a state of the process of the data, setting information indicating a setting related to the process of the data; and an output unit configured to, according to establishment of short-range wireless communication with a wireless communication apparatus, output the handover information to the wireless communication apparatus.

Further features of the present disclosure will become apparent from the following description of exemplary embodiments with reference to the attached drawings.

BRIEF DESCRIPTION OF THE DRAWINGS

FIG. 10 is a diagram illustrating an example of a handover information selection screen.

FIG. 14 is a diagram illustrating an example of a printing delegation setting screen.

FIG. 24 is a flow chart illustrating the general processing when the reproduction of a moving image is handed over.

DESCRIPTION OF THE EMBODIMENTS

Various exemplary embodiments, features, and aspects of the invention are described in detail below with reference to the drawings.

Figure 1:
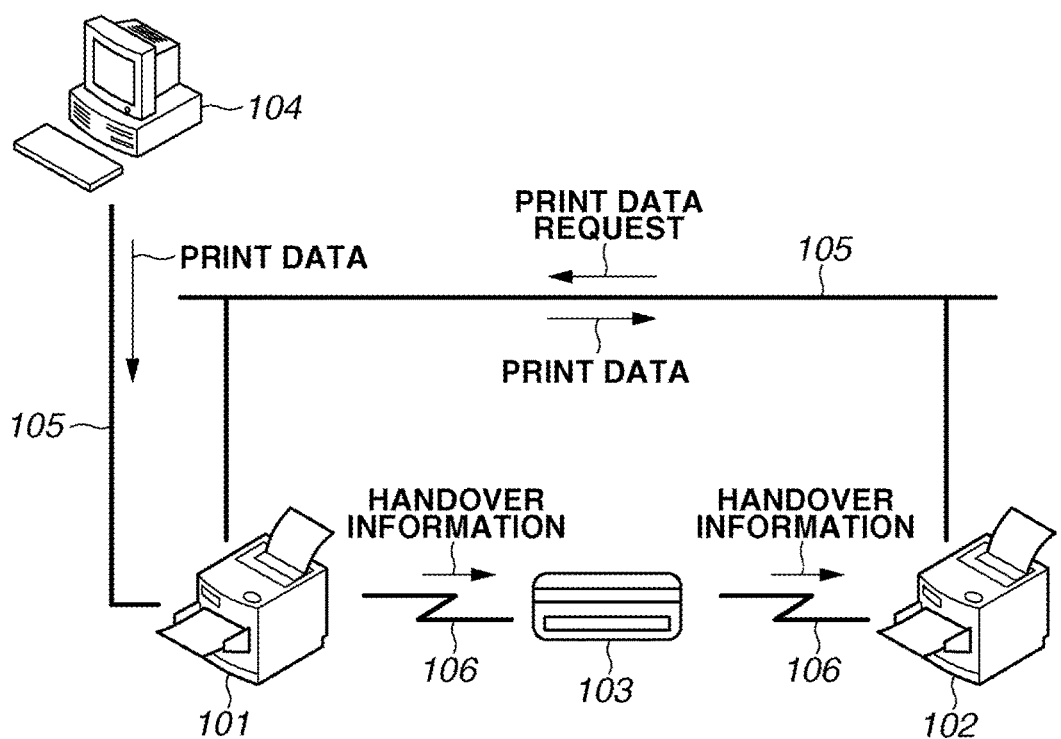
FIG. 1 is a schematic diagram illustrating the general form of an information processing system.

FIG. 1 is a schematic diagram illustrating an information processing system according to a first exemplary embodiment. The system includes: an MFP 101, which serves as an information processing apparatus and a handover source; an MFP 102, which serves as an information processing apparatus and a handover destination; a contactless integrated circuit (IC) card 103, which serves as a recording medium; and a personal computer (PC) 104, which serves as an information processing terminal. The information processing terminal may be a terminal apparatus such as a smartphone or a tablet, instead of a PC. Further, the MFPs 101 and 102 and the PC 104 can establish a communication connection with one another through a network (N/W) 105. It does not matter whether the communication method is wired or wireless communication. Further, each of the MFPs 101 and 102 can communicate with the contactless IC card 103 present at a short distance therefrom, using short-range wireless communication 106. In the present exemplary embodiment, an example is described where Near Field Communication (NFC) is used as the short-range wireless communication 106. The communication range of NFC is less than 10 centimeters. Thus, a user brings a communication processing unit 301 of the MFP 101 and an antenna 402 of the contactless IC card 103 close to each other so that the distance between the communication processing unit 301 and the antenna 402 is less than 10 centimeters. This enables the user to establish the short-range wireless communication 106 between the MFP 101 and the contactless IC card 103. Further, the user brings the antenna 402 of the contactless IC card 103 out of the communication range of the communication processing unit 301. This enables the user to disconnect the short-range wireless communication 106 between the MFP 101 and the contactless IC card 103. The method of the short-range wireless communication 106 between the MFP 102 and the contactless IC card 103 is similar to that between the MFP 101 and the contactless IC card 103.

Figure 2:
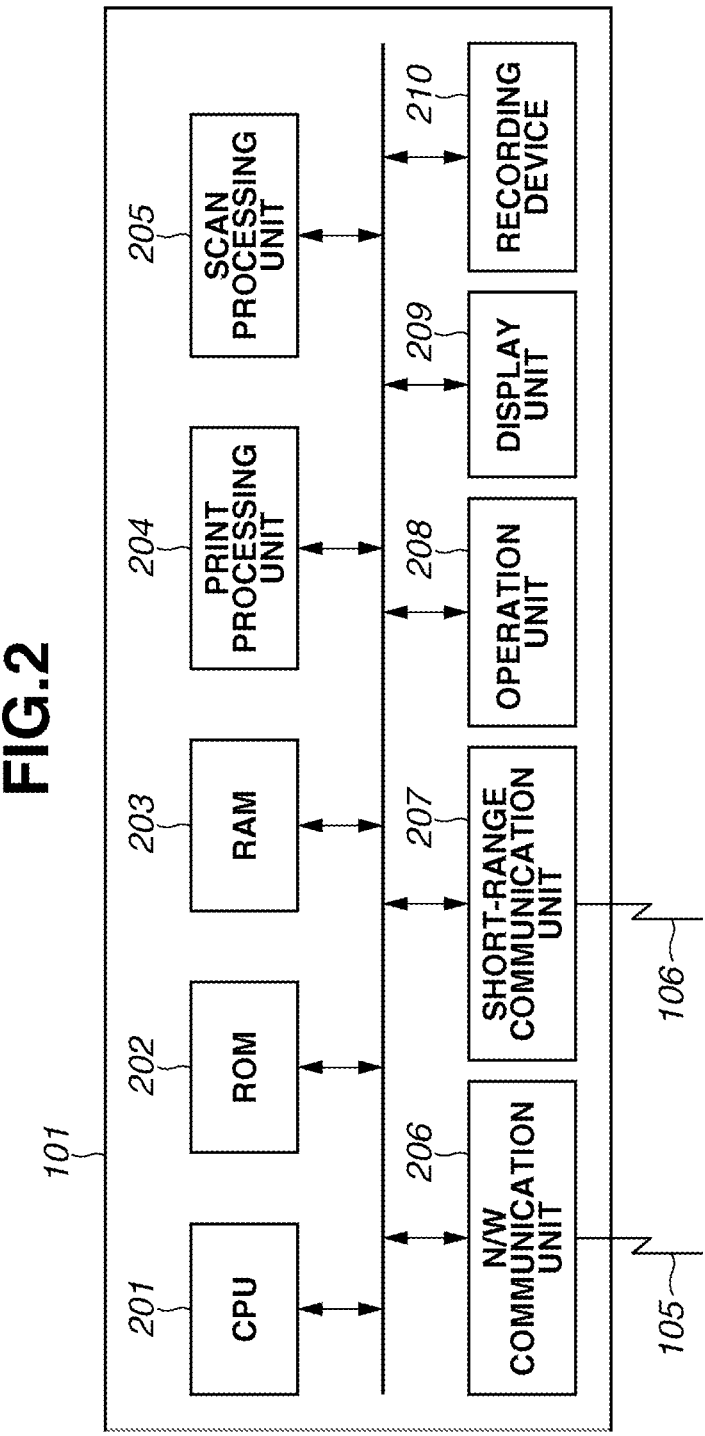
FIG. 2 is a block diagram illustrating the general configuration of an MFP.

FIG. 2 is a diagram illustrating the general configuration of the MFP 101. A central processing unit (CPU) 201 is a unit that controls the entirety of the MFP 101. The CPU 201 performs overall control of the processing sequence of the MFP 101. A read-only memory (ROM) 202 stores a program for achieving flow charts described later, and fixed data. A random-access memory (RAM) 203 is used to temporarily save data and load the program. A print processing unit 204 includes an ink-jet or laser printer device. The print processing unit 204 controls the printer device and performs the process of printing image data (data processing). A scan processing unit 205 includes a scanner device. The scan processing unit 205 controls the scanner device and performs the process of reading a document. The read image data is printed by the print processing unit 204 or transmitted to an external device via an N/W communication unit 206. A short-range communication unit 207 includes an NFC chip. The short-range communication unit 207 establishes a communication connection with an external device using the short-range wireless communication 106, and controls the transmission and reception of data. An operation unit 208 receives a button operation on the MFP 101 and input from the user through a touch panel. A display unit 209 includes a display such as a liquid crystal display (LCD). The display unit 209 displays an image and text data according to the processing content of the MFP 101. A recording device 210 is a device for storing print data. The MFP 102 includes components similar to those of the MFP 101.

Figure 3:
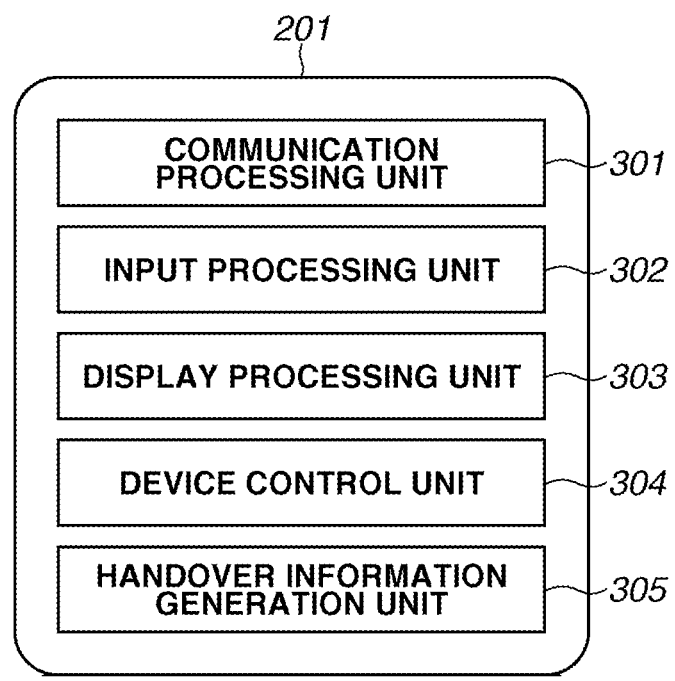
FIG. 3 is a block diagram illustrating the general functions of a program.

FIG. 3 is the general functions achieved by the CPU 201 executing the program stored in the ROM 202. The communication processing unit 301 manages an IP address to achieve a communication connection with another device via the N/W communication unit 206. Examples of the communication method include wireless communication such as the Institute of Electrical and Electronics Engineers (IEEE) 802.11 and Bluetooth (registered trademark), and wired communication such as IEEE 802.3. Further, the communication processing unit 301 transmits and receives data to and from the contactless IC card 103 via the short-range communication unit 207 and processes the data. An input processing unit 302 processes input information received by the operation unit 208. A display processing unit 303 performs the process of outputting a display image to the display unit 209. A device control unit 304 controls the print processing unit 204, the scan processing unit 205, and the recording device 210. Further, the device control unit 304 acquires and holds the processing state of print data, such as the page numbers of the pages of which the printing has been completed and the page number of the page that is being subjected to a printing process. A handover information generation unit 305 performs the process of generating handover information, which is information required for handing over a process from the MFP 101 that serves as the handover source to the MFP 102 that serves as the handover destination.

Figure 4:
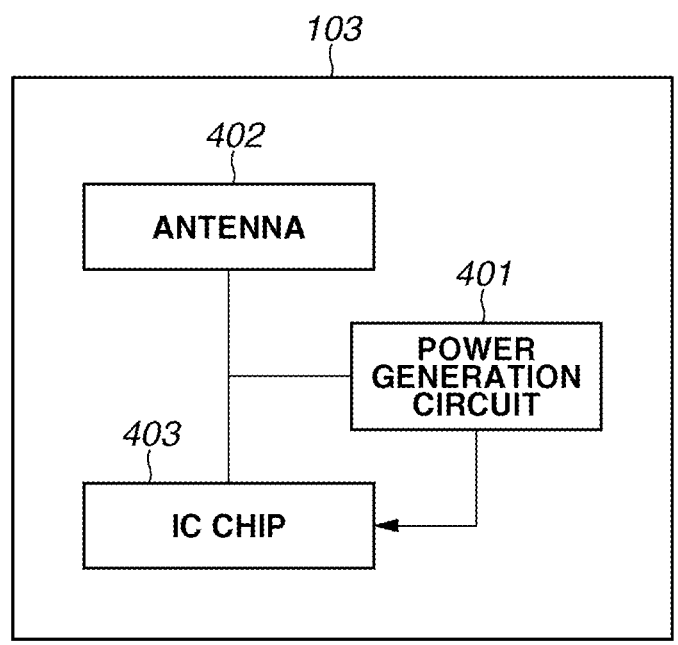
FIG. 4 is a block diagram illustrating the general configuration of a contactless IC card.

FIG. 4 is a schematic diagram illustrating the hardware configuration of the contactless IC card 103. A power generation circuit 401 obtains, via the antenna 402 and by electromagnetic induction, power from weak radio signals produced by the short-range communication unit 207. Then, when the obtained power has exceeded a prescribed value, an IC chip 403 is activated. The IC chip 403 receives a message from the MFP 101 via the antenna 402 and processes the message. Further, the IC chip 403 switches the loads, thereby transmitting data to the MFP 102 via the antenna 402. Further, the IC chip 403 includes a non-volatile storage area and performs the process of writing and reading data to and from the non-volatile storage area according to the received message.

Figure 5:
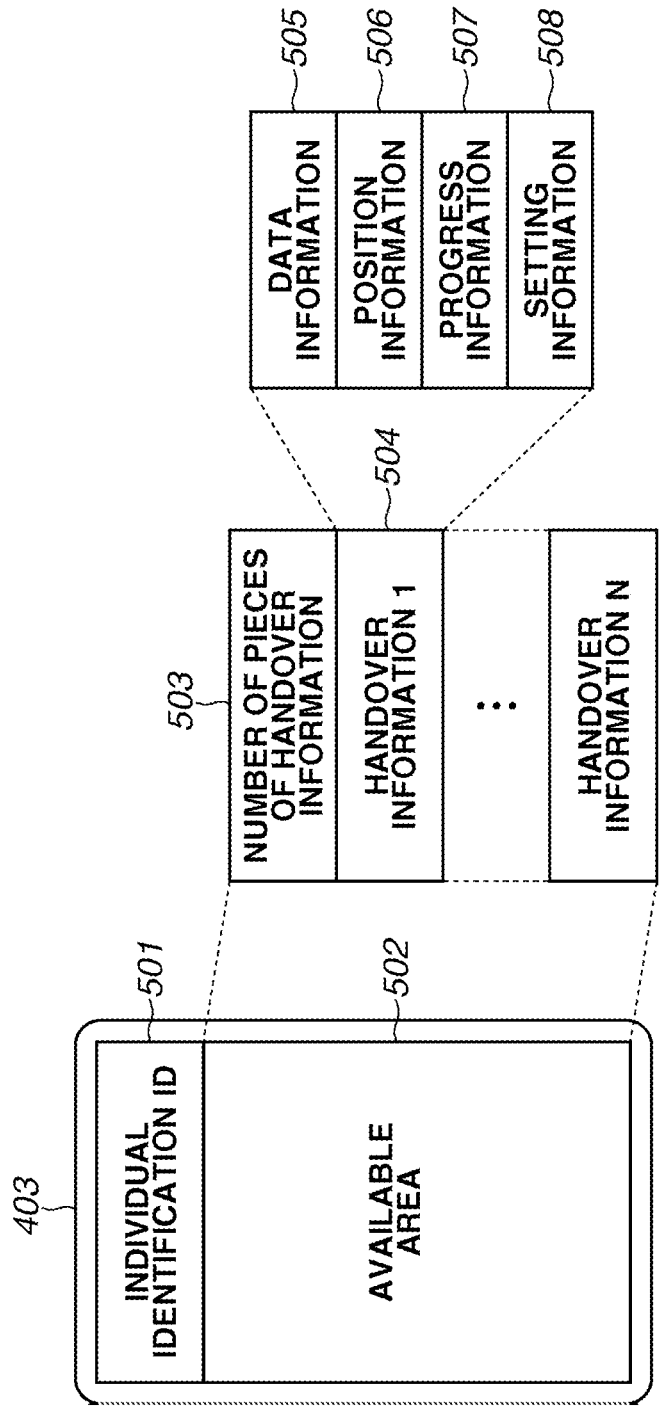
FIG. 5 is a memory map illustrating the storage content of an IC chip.

FIG. 5 is a memory map of the non-volatile storage area included in the IC chip 403. The non-volatile storage area of the IC chip 403 includes an individual identification identifier (ID) 501 and an available area 502. The individual identification identifier 501 is an ID for identifying each individual card. The individual identification identifier 501 of each card is assigned a non-overlapping value at the factory and cannot be rewritten by the user. The available area 502 is a non-volatile storage area to which data can be written according to the message from another information processing apparatus having a wireless communication function. The available area 502 includes the number of pieces of handover information 503 and handover information 504. The number of pieces of handover information 503 is an area for recording the number of the pieces of handover information 504 saved in the available area 502. The pieces of handover information 504 are present as many as the number of pieces of handover information 503. Each of the pieces of handover information 504 includes data information 505, position information 506, progress information 507, and setting information 508. In the present exemplary embodiment, the data information 505 is print data information such as the name, the number of pages, and the input time of print data. The position information 506 is information indicating the saving location for print data, such as the Internet Protocol (IP) address and the media access control (MAC) address of an external apparatus. The progress information 507 is information representing the processing state of data that is being subjected to a printing process. Specifically, the progress information 507 is the page number of the last output page when a printing error has occurred (or simply the enumeration of the pages of which the printing has been completed), the page on which an error has occurred, or a set of page numbers of the pages to be processed by an information processing apparatus that is the handover destination. The setting information 508 is information regarding print settings. Specifically, the setting information 508 includes setting information applied when an error has occurred, such as the color/monochrome setting and the sheet size to be used.

Figure 6:
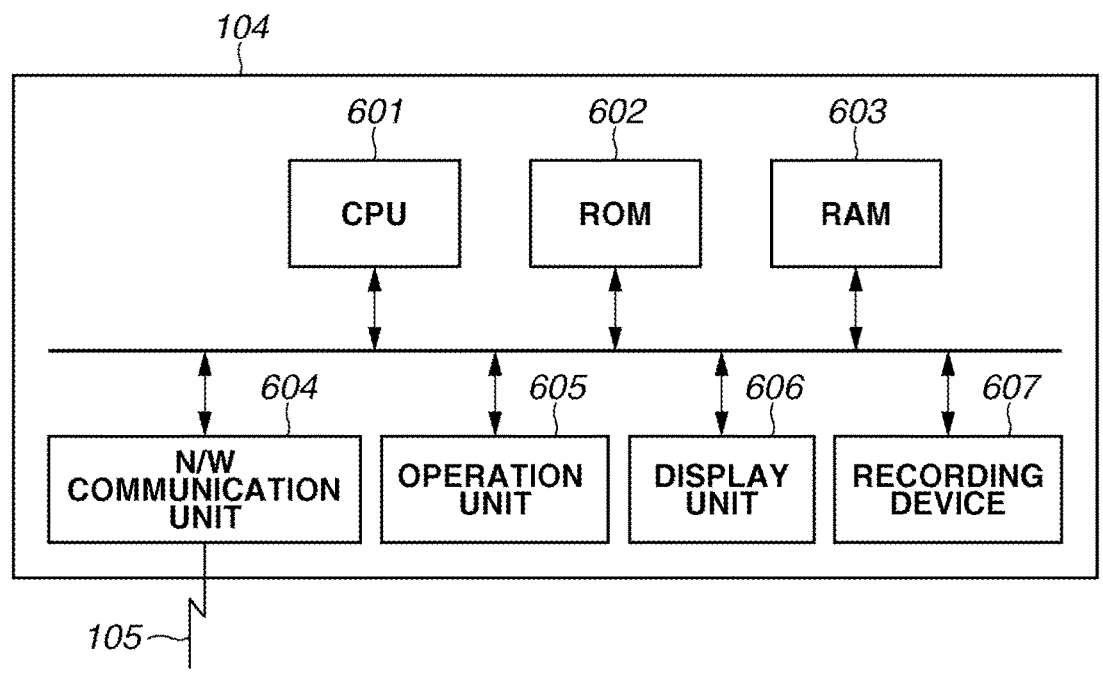
FIG. 6 is a block diagram illustrating the general configuration of a PC.

FIG. 6 is a diagram illustrating the general configuration of the PC 104. A CPU 601 is a central processing unit that controls the entirety of the PC 104. A ROM 602 stores a print data generation program for generating print data, and fixed data. A RAM 603 is used to temporarily save data and load the program. The print data generation program is a program having the function of converting a document file into print data, such as a printer driver. An N/W communication unit 604 enables the PC 104 to communicate with another communication apparatus via wired or wireless communication. Further, the CPU 601 processes input information received by an operation unit 605, and performs the process of outputting a display image to a display unit 606. A recording device 607 is a device for storing files such as document files and image files. The CPU 601 executes the print data generation program stored in the ROM 602, thereby converting a file stored in the recording device 607 into print data.

Figure 7:
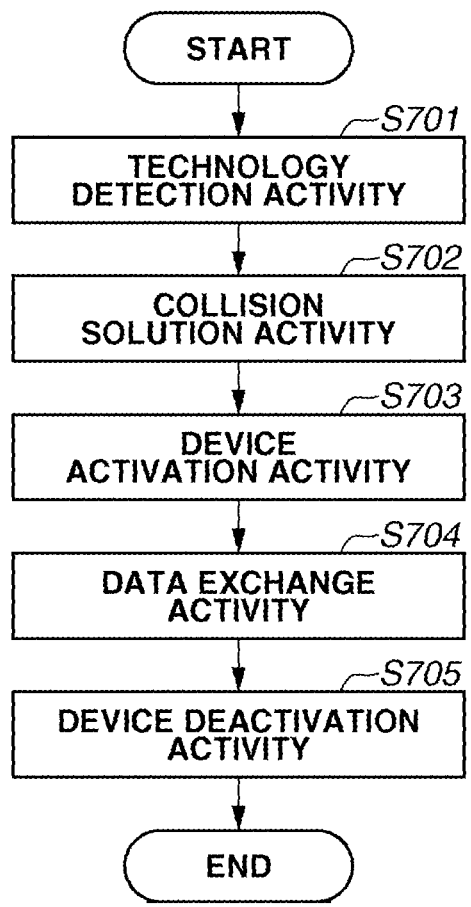
FIG. 7 is a flow chart illustrating the processing of the activities of NFC.

FIG. 7 is a processing flow chart illustrating the activities of NFC for use in the short-range wireless communication 106. In a communication process using NFC, an NFC device performs a series of processes termed activities, thereby detecting a communication partner, establishing communication, and transmitting and receiving data. An NFC device is a device including an NFC chip. In each of the activities, a plurality of NFC devices transmit and receive commands to and from each other, thereby establishing communication, exchanging data, and performing an ending process. Next, the transition of activities is described. In a technology detection activity (step S701), an NFC device detects whether or not another NFC device is present within the communication range of the NFC device. If another NFC device has been found, the NFC device determines the NFC type of the opposing device, i.e., the other NFC device, by transmitting and receiving of commands to and from the opposing device. In a collision solution activity (step S702), if a plurality of NFC devices has been detected, the NFC device identifies the plurality of NFC devices. In a device activation activity (step S703), the NFC device determines whether or not the detected opposing device is compatible with any of modes such as a peer-to-Peer (P2P) mode and a card emulator (CE) mode. Alternatively, the NFC device determines a type with which the NFC card is compatible. An NFC card is an IC card to and from which an NFC tag reader/writer can read and write. The P2P mode is a mode where NFC devices communicating with each other both operate in the P2P mode, and thereby can transmit and receive any data to and from each other. An NFC device can transition to not only the P2P mode, but also to the CE mode where the NFC device behaves like an NFC card to allow access from an NFC card reader/writer, and a reader/writer (R/W) mode where the NFC device reads and writes to and from an NFC card. In the present exemplary embodiment, the communication processing unit 301 operates in the R/W mode and controls the communication between the short-range communication unit 207 and the antenna 402. In a data exchange activity (step S704), the NFC device transmits and receives data to and from the detected opposing device. According to this activity, the NFC device can transmit and receive any data to and from the opposing device. In a device deactivation activity (step S705), the NFC device performs the process of ending the communication. In the series of processes from steps S701 to S705, the communication mode for actively transmitting a command is defined as a polling mode in the NFC standard. In the present exemplary embodiment, the case is described where the MFPs 101 and 102 connect to each other in the polling mode. By the series of activity processes described above, an NFC communication connection is established, and data is transmitted and received, according to the approach of the NFC chip included in the short-range communication unit 207, to each of the MFPs 101 and 102 and the antenna 402 of the contactless IC card 103. Furthermore, there is known a handover technique for performing only paring and authentication using NFC, and handing over communication to a high-speed standard such as IEEE 802.11 or Bluetooth (registered trademark).

In the present exemplary embodiment, an example is described where the MFPs 101 and 102 and the contactless IC card 103 hand over a printing job performed by a print function, according to short-range wireless communication. The description is given in two parts: the time when a printing error occurs; and the time when printing is handed over.

Figure 8:
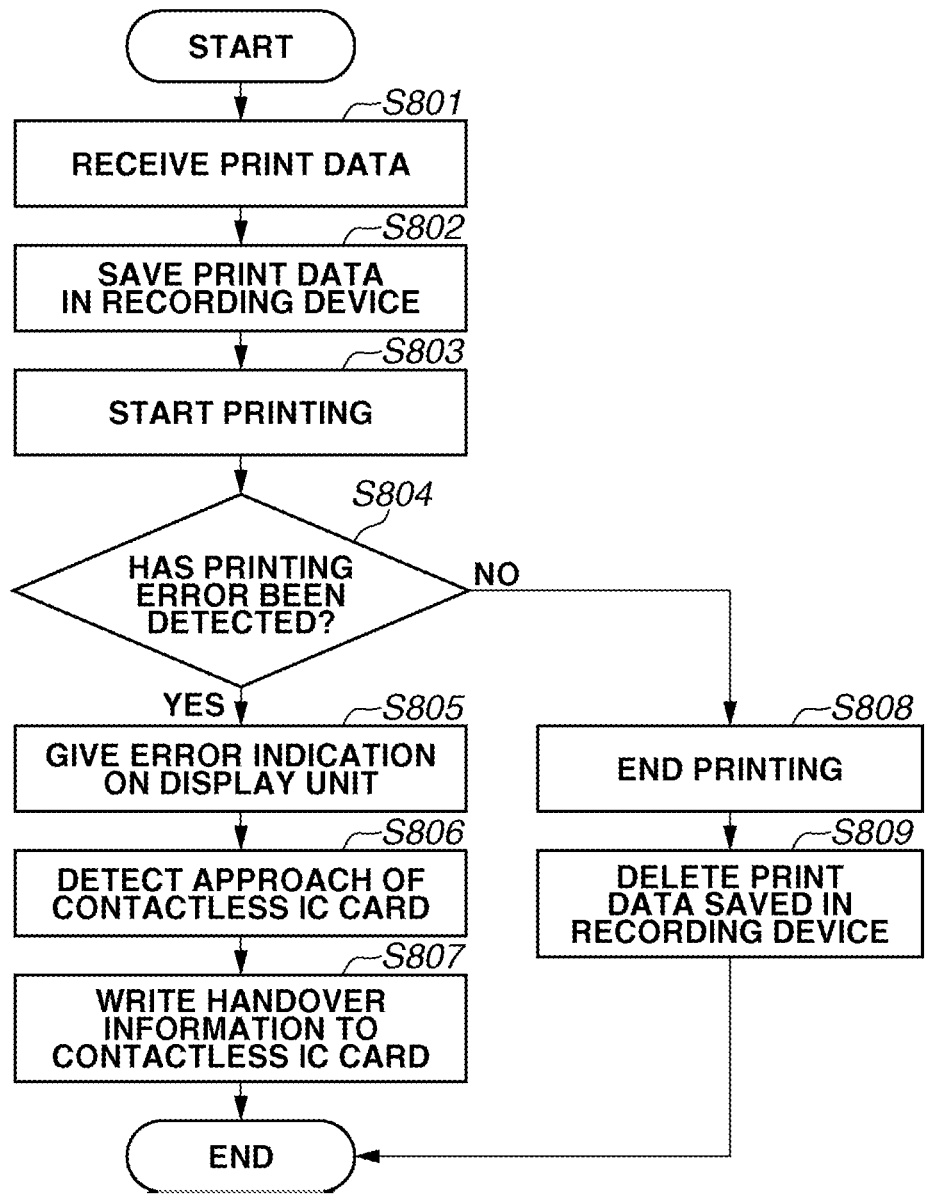
FIG. 8 is a flow chart illustrating the general processing when an error occurs.

First, FIG. 8 illustrates the processing flow of the MFP 101 when a printing error occurs. In step S801, the communication processing unit 301 of the MFP 101 receives print data from the PC 104 via the N/W communication unit 206. The print data includes: print data information such as an identifier that enables the identification of the print data; and image data. In step S802, the device control unit 304 saves the received print data in the recording device 210. In step S803, the device control unit 304 controls the print processing unit 204 to start printing by using the print data saved in step S802. In step S804, if the device control unit 304 has detected that a printing error has occurred (YES in step S804), the processing proceeds to step S805. In step S805, the display processing unit 303 indicates on the display unit 209 that an error has occurred, thereby prompting the user to bring the contactless IC card 103 into contact with the MFP 101. In step S806, the communication processing unit 301 detects the approach of the contactless IC card 103 to the short-range communication unit 207. This process corresponds to the activities in steps S701 to S703. In step S807, the communication processing unit 301 reads the number of pieces of handover information from the IC card 103 and records the number of pieces in the RAM 203. Then, the handover information generation unit 305 generates handover information and records the handover information in the RAM 203, and then adds one to the number of pieces of handover information recorded in the RAM 203. When generating the handover information, the handover information generation unit 305 records, as position information to be included in the handover information, the IP address provided in the communication processing unit 301 of the MFP 101. Further, the handover information generation unit 305 records, as progress information to be included in the handover information, the page number of the page on which the error has occurred or the page number of the last printed page, each page number held in the device control unit 304. Then, the communication processing unit 301 operates in the R/W mode for the contactless IC card 103 via the short-range communication unit 207 and writes the number of pieces of handover information and the pieces of handover information recorded in the RAM 203, to the available area 502 of the IC chip 403. When the writing of the pieces of handover information has been completed, the communication processing unit 301 notifies the PC 104 via the N/W communication unit 206 that the job has been handed over. The process between the MFP 101 and the contactless IC card 103 in step S807 corresponds to the data exchange activity in step S704. In step S804, if the device control unit 304 has not detected a printing error (NO in step S804), the processing proceeds to step S808. In step S808, the device control unit 304 ends the printing. Then, in step S809, the device control unit 304 deletes the print data saved in the recording device 210 in step S802.

Figure 9:
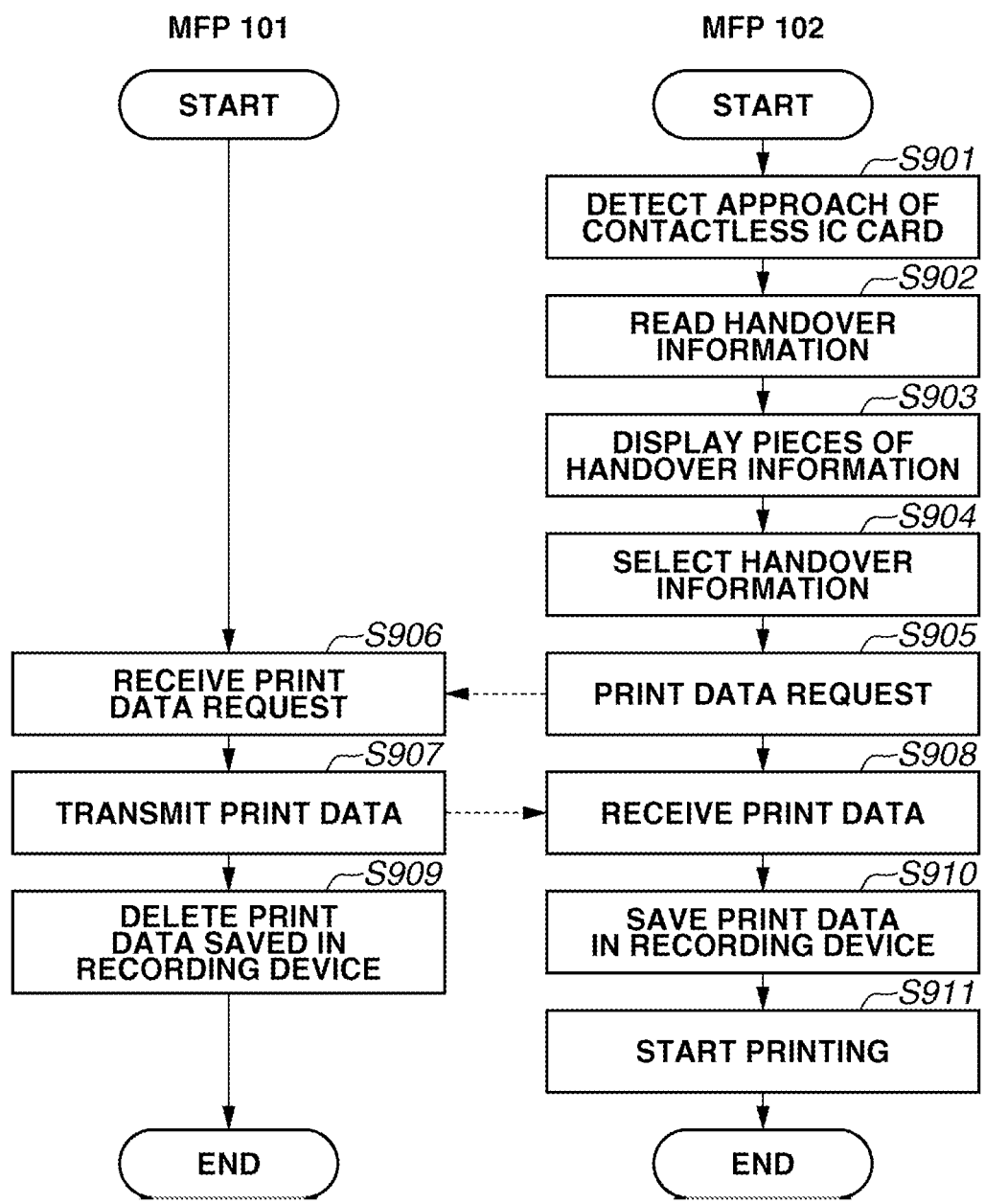
FIG. 9 is a flow chart illustrating the general processing when printing is handed over.

Next, FIG. 9 illustrates the processing flow of the MFPs 101 and 102 when printing is handed over. In step S901, the communication processing unit 301 of the MFP 102 detects the approach of the contactless IC card 103 to the short-range communication unit 207. In step S902, the communication processing unit 301 operates in the R/W mode for the contactless IC card 103 via the short-range communication unit 207. This operation causes the communication processing unit 301 to read the number of pieces of handover information 503 and handover information 504 recorded in the available area 502 of the IC chip 403, and to record the number of pieces of handover information and the handover information in the RAM 203. If handover information is not present in the contactless IC card 103, the processing ends without proceeding to step S903. At this time, the display processing unit 303 may give an error indication on the display unit 209, stating that handover information is not present. In step S903, the display processing unit 303 displays the details of handover information on the display unit 209. In step S904, the input processing unit 302 receives user operation information via the operation unit 208 and determines handover information about a target which takes over printing. If, for example, only one piece of handover information is recorded in the contactless IC card 103, the input processing unit 302 may uniquely determine handover information without receiving an operation from the user. Further, when the handover information has been determined, the communication processing unit 301 deletes the determined handover information from the contactless IC card 103 via the short-range communication unit 207. At this time, the communication processing unit 301 subtracts one from the number of pieces of handover information recorded in the RAM 203 in step S902. Then, the communication processing unit 301 writes the number of pieces of handover information recorded in the RAM 203 to the available area 502 of the IC chip 403 via the short-range communication unit 207. In step S905, the communication processing unit 301 refers to the print data information and the position information included in the handover information determined in step S904. Then, the communication processing unit 301 transmits a print data request including the print data information to a target indicated by the position information (the MFP 101 in the present exemplary embodiment) via the N/W communication unit 206. In step S906, the communication processing unit 301 of the MFP 101 receives the print data request via the N/W communication unit 206 and records the content of the print data request in the RAM 203. In step S907, the device control unit 304 compares the print data information received from the MFP 102 with the print data information included in the print data saved in the recording device 210. By this comparison, the device control unit 304 identifies relevant print data among the print data saved in the recording device 210. Then, the communication processing unit 301 transmits the print data via the N/W communication unit 206 to the MFP 102, which is the request source of the print data. In step S908, the communication processing unit 301 receives the print data from the MFP 101 via the N/W communication unit 206. In step S909, the device control unit 304 deletes the print data saved in the recording device 210 in step S802. In step S910, the device control unit 304 saves the print data received in step S908 in the recording device 210. In step S911, the device control unit 304 refers to, via the print processing unit 204, the progress information included in the handover information determined in step S904, thereby reading and discarding print data of already printed pages, and prints only the pages that can be determined as pages yet to be printed. At this time, the device control unit 304 refers to the setting information included in the determined handover information, and performs printing according to the setting information.

FIG. 10 is an example of a display screen displayed in step S903. In FIG. 10, three pieces of handover information are illustrated. The number of pieces of handover information to be displayed on the screen is determined based on the number of pieces of handover information 503 recorded in the available area 502 of the IC chip 403. Four items of each handover information, namely, the document name, the saving location, the print settings, and already printed pages are displayed. The document name corresponds to the print data information included in the handover information, and indicates the name of the print data. The saving location corresponds to the position information included in the handover information, and indicates the IP address of the apparatus in which the print data is saved. The print settings correspond to the print setting information included in the handover information, and indicate print setting information such as 2 in 1 and one-sided/two-sided printing. The already printed pages correspond to the progress information included in the handover information, and indicate the page numbers of the pages of which the printing has already been completed. In FIG. 10, an arrow is a symbol indicating the handover information that the user is going to select.

If the MFPs 101 and 102 have detected the contactless IC card 103, then as shown in step S807 and step S902, the MFPs 101 and 102 write or read the handover information to or from the contactless IC card 103. The determination of whether to write to or read from the contactless IC card 103 is made based on the processing states of the MFPs 101 and 102. If an error has occurred during the printing being performed by either the MFP 101 or 102 and the communication processing unit 301 has detected the contactless IC card 103 in the state where the printing is stopped, the process of step S807 is performed. If the communication processing unit 301 of either the MFP 101 or 102 has detected the contactless IC card 103 in other states, the process of step S902 is performed.

In step S903, if the determined handover information includes setting information with which the MFP 102 is not compatible, the MFP 102 ignores the information and performs printing within the capability of the MFP 102. For example, if the MFP 102 has only a monochrome print function and takes over the printing set to color print, the device control unit 304 executes monochrome printing instead of the color printing. Alternatively, the display processing unit 303 may give an error indication on the display unit 209, and the device control unit 304 may not perform printing. Yet alternatively, the display processing unit 303 may give an error indication on the display unit 209, thereby prompting the user to determine by using the operation unit 208 whether or not to perform printing.

In the print data reception process (steps S905 to S908) in the above flow, an example is provided where the MFP 102 receives all print data from the MFP 101, and reads the data and discards unnecessary print data. Alternatively, for example, the MFP 102 may receive only necessary print data. In this case, in step S905, the communication processing unit 301 transmits a print data request including the print data information and the progress information to the MFP 101. Then, in step S907, the device control unit 304 refers to the print data information, thereby identifying relevant print data among the print data saved in the recording device 210. Then, the device control unit 304 refers to the progress information, thereby identifying print data of the pages yet to be printed, in the identified print data. Then, the communication processing unit 301 transmits the identified print data to the MFP 102.

Further, in the above flow, the print data is deleted in step S909, and the print data is saved in step S910. Alternatively, for example, the following method may also be possible. In step S909, the print data saved in the recording device 210 is not deleted, and in step S910, the print data is not saved in the recording device 210. Then, when the MFP 102 has successfully completed the printing, the communication processing unit 301 requests the MFP 101 to delete the print data via the N/W communication unit 206.

Figure 11:
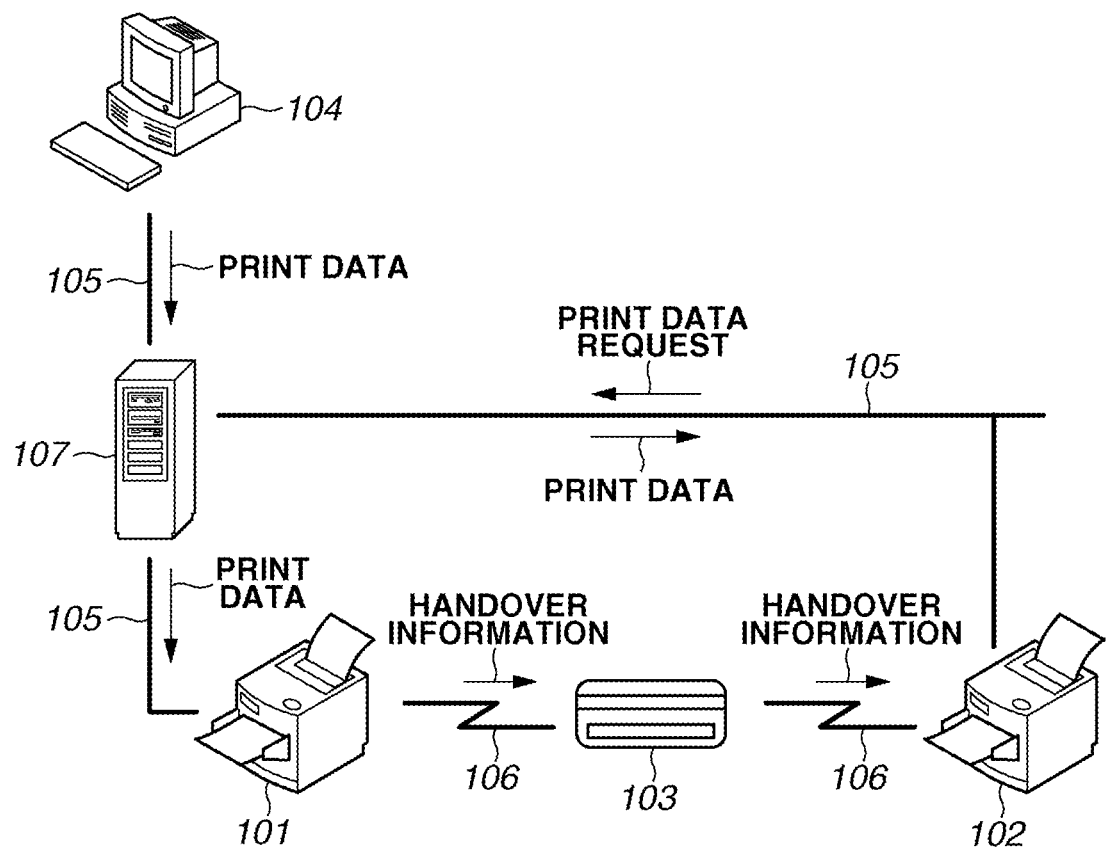
FIG. 11 is a schematic diagram illustrating the general form of an information processing system.
Figure 12:
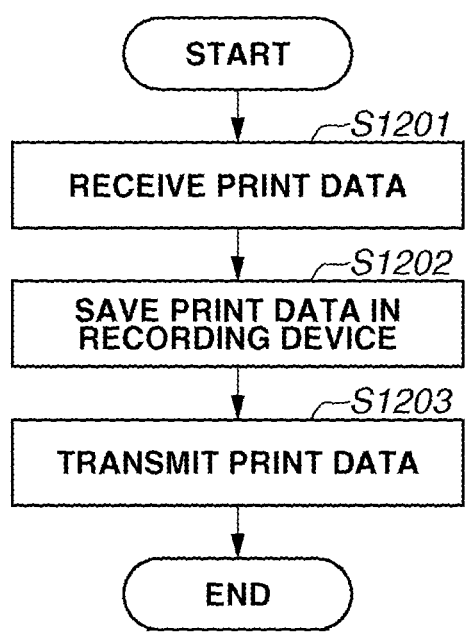
FIG. 12 is a flow chart illustrating the general processing of a print server.

As illustrated in FIG. 11, a print server 107 may be provided. The print server 107 includes components similar to those illustrated in FIG. 6; however, the operation unit 605 and the display unit 606 are not necessarily required. FIG. 12 illustrates the processing flow of the print server 107 when print data is input in the case of the configuration in FIG. 11. In step S1201, the CPU 601 of the print server 107 receives print data from the PC 104. The print data includes: print data information including an identifier that enables the identification of the print data and the IP address of an MFP which executes printing; and image data. In step S1202, the CPU 601 saves the received print data in the recording device 607. In step S1203, the CPU 601 transmits the print data to the IP address included in the print data received in step S1201. The processing flow of the MFP 101 when a printing error occurs is almost similar to that in FIG. 8. In step S802, however, only the fact that the print data is saved in the recording device 607 of the print server 107 may need to be recorded as the position information such as the IP address of the print server 107. Further, in step S809, the MFP 102 requests the print server 107 to delete the print data of which the printing has been completed. The processing when the printing is handed over is almost similar to that in FIG. 9, except that in the configuration of FIG. 11, the print server 107 behaves like the MFP 101 in FIG. 9.

Figure 13:
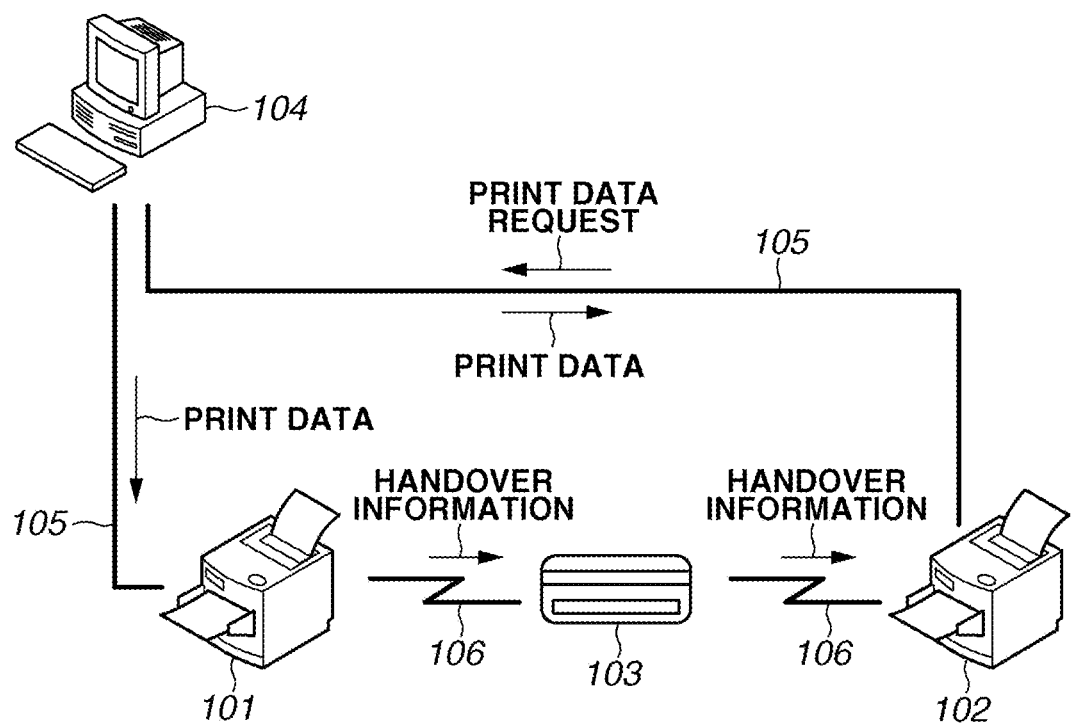
FIG. 13 is a schematic diagram illustrating the general form of an information processing system.

Alternatively, as illustrated in FIG. 13, when printing is handed over, the PC 104 may retransmit the print data. In this case, the processing flow of the MFP 101 when a printing error occurs is almost similar to that in FIG. 8. In step S802, however, only the IP address of the PC 104 may need to be recorded as the position information. The processing when printing is handed over is almost similar to that in FIG. 9, except that in the configuration of FIG. 13, the PC 104 behaves like the MFP 101 in FIG. 9. Further, in step S906, the PC 104 receives the print data request including the print data information from the MFP 102. Then, by using, for example, the file name included in the print data information as an identifier, the PC 104 identifies a file to be used to generate print data among files saved in the recording device 607. Then, the CPU 601 executes the print data generation program stored in the ROM 602, thereby converting the identified file into print data and retransmitting the print data. The other processes are similar to those in FIGS. 8 and 9.

Further, the above description is given of the handover of a process of printing the print data. Alternatively, a copying process may be handed over using the configuration of FIG. 1. In the case of the copying process, the PC 104 and the N/W 105 are not necessarily required. If, however, the handing over a copying process is performed, it is desirable to place a document to be copied on the MFP 101. Regarding the handover of a copying process, the differences from FIGS. 8 and 9 are described below. In step S801, the device control unit 304 executes scanning via the scan processing unit 205, thereby generating image data based on a placed document. Then, the device control unit 304 generates print data information including printing turn-on time as an identifier of print data, and assigns the print data information to the generated image data, thereby generating print data. The other processes are similar to those in FIGS. 8 and 9.

In the above description, an example is described where a process is handed over using the occurrence of a printing error as a trigger. Alternatively, for example, a printing process of the MFP 101 may be suspended by the user touching the contactless IC card 103 as a trigger. Then, the progress information and the setting information of the MFP 101 may be written to the contactless IC card 103, thereby handing over the process. This trigger may be an operation performed on the operation unit 208 by the user. Such a configuration also enables the suspension of a process of the MFP 101. When suspending the printing based on the touch, the device control unit 304 executes the suspension in consideration of the print settings. For example, if the print settings are set to 2 in 1, print data of an odd page and an even page is processed. Then, when a single paper sheet has been output, the device control unit 304 suspends the printing. Further, the progress information and the setting information stored in the contactless IC card 103 from the MFP 101 may be returned to the MFP 101 by touching the MFP 101 with the contactless IC card 103, whereby the printing can be resumed in the same apparatus.

Further, in the above description, an example is described where the printing is suspended and resumed. Alternatively, a printing process of the MFP 101 may be delegated to the MFP 102. The delegation of printing means that if, for example, the MFP 101 has received certain print data, the MFP 101 transfers a part or all of the print data to the MFP 102. The MFP 101 does not print the transferred print data, and entrusts the MFP 102 with the printing. An example of delegating the printing process performed by a print function is described in two parts: the time when the delegation of printing is set; and the time when printing is delegated. The processing flow when the delegation of printing is set is almost similar to that in FIG. 8. In step S804, however, the printing process is suspended using a touch of the contactless IC card 103 or an operation on the operation unit 208 as a trigger. Then, in step S805, the display processing unit 303 of the MFP 101 displays on the display unit 209 a printing delegation setting screen for setting the delegation of printing, thereby prompting the user to input a setting. On the printing delegation setting screen, the user can input the numbers of the pages for the printing to be delegated to another MFP. Then, the input processing unit 302 receives via the operation unit 208 a set of numbers of the pages for the printing to be delegated to another MFP, and the input processing unit 302 records the content of the set of page numbers in the RAM 203. A set of numbers of pages means a set of all page numbers of the pages for the printing to be delegated to another MFP. For example, when the printing of pages 5 to 8 is delegated to another MFP, values of 5, 6, 7, and 8 are recorded as a set of numbers of pages. Then, the device control unit 304 saves the set of page numbers recorded in the RAM 203 and the print data in the recording device 210 by linking the set of page numbers with the print data. Further, in step S807, the handover information generation unit 305 includes, as the progress information of the handover information, the set of page numbers specified by the user. After the handover process has been completed, the device control unit 304 of the MFP 101 resumes the printing and refers to the set of page numbers saved in the recording device 210, thereby printing only the pages of which the printing has not been delegated. At this time, the device control unit 304 saves the page numbers of the pages of which the printing has been completed and the print data in the recording device 210 by linking the page numbers with the print data. The processing flow when printing is delegated is almost similar to that in FIG. 9. In step S911, however, the device control unit 304 of the MFP 102 refers to, via the print processing unit 204, the set of page numbers included as the progress information in the handover information, thereby printing only the pages of which the page numbers are included in the set of page numbers. Then, if the printing has been completed, the device control unit 304 transmits, to the MFP 101, printing completion notification including the page numbers of the pages of which the printing has been completed. The communication processing unit 301 of the MFP 101 receives the printing completion notification from the MFP 102, and the device control unit 304 saves the page numbers included in the printing completion notification and the print data in the recording device 210 by linking the page numbers with the print data. Only when having confirmed that all the pages have been printed, the device control unit 304 deletes the print data saved in the recording device 210. FIG. 14 is an example of the printing delegation setting screen. In FIG. 14, four items regarding print data during the progress of printing are displayed, namely, the document name, the saving location, the print settings, and already printed pages. The document name indicates the name of the print data. The saving location indicates the IP address of the apparatus in which the print data is saved. The print settings indicate print setting information such as 2 in 1 and one-sided/two-sided printing. The already printed pages indicate the page numbers of the pages of which the printing has already been completed. A start page indicates the page number of the first page to be printed by an MFP to which the printing is to be delegated. An end page indicates the page number of the last page to be printed by the MFP to which the printing is to be delegated. Thus, the settings in FIG. 14 mean that the printing of the pages with page numbers 5 to 12 is delegated to another MFP. The user can input the page numbers of the start page and the end page via the operation unit 208. FIG. 14 illustrates an example of a screen on which consecutive page numbers are input. Alternatively, a screen on which any page numbers can be input may be displayed. In this case, the user can set the delegation of printing by specifying any page numbers such as "5-9, 11, 13" via the operation unit 208. In the present exemplary embodiment, an example is provided where printing is delegated to one MFP (the MFP 102). Alternatively, printing may be delegated to two or more MFPs.

As described above, according to the present exemplary embodiment, the user can intuitively hand over a process of the MFP 101 that is the handover source to the MFP 102 that is the handover destination, by sequentially touching the MFPs 101 and 102 with the contactless IC card 103 to establish communication.

In a second exemplary embodiment, an example is described where an MFP 101, which serves as a handover source, an MFP 102, which serves as a handover destination, and a mobile terminal 108 transfer print data between the MFPs 101 and 102, thereby handing over a printing process to be performed by a print function. The description is given in two parts: the time when a printing error occurs; and the time when printing is handed over. The second exemplary embodiment is different from the first exemplary embodiment in that the mobile terminal 108 is used instead of the contactless IC card 103.

Figure 15:
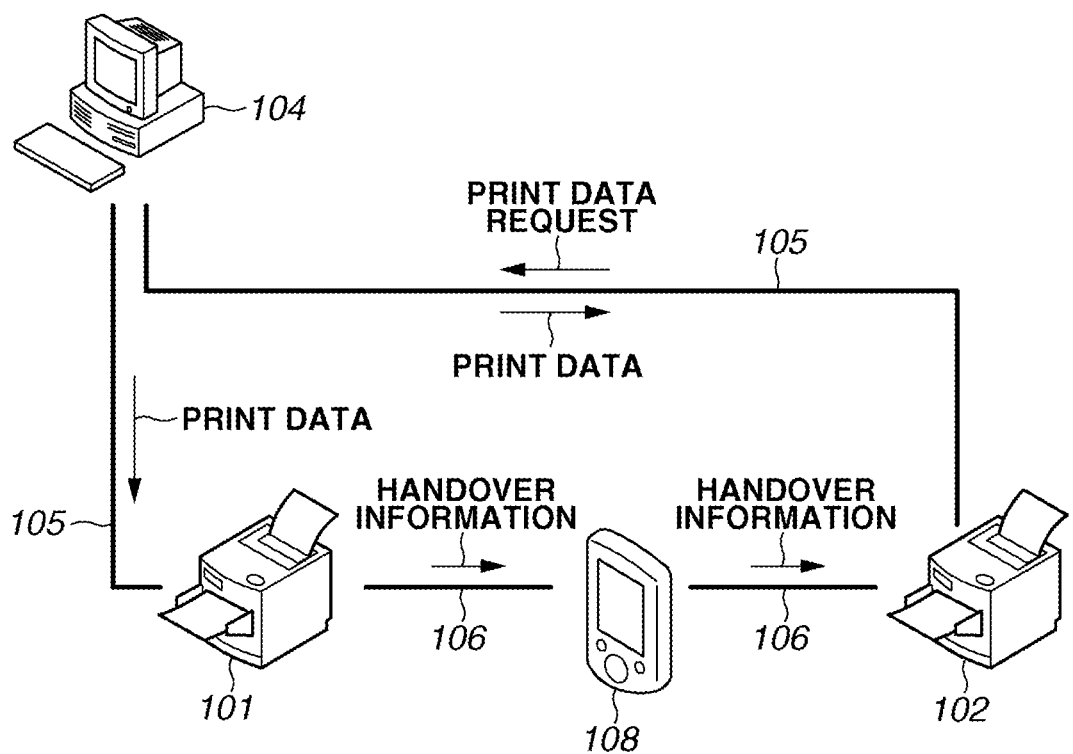
FIG. 15 is a schematic diagram illustrating the general form of an information processing system.

FIG. 15 is a diagram illustrating the general configuration of an information processing system according to the second exemplary embodiment. The system includes: MFPs 101 and 102, which serve as information processing apparatuses; a PC 104, which serves as an information processing terminal; and a mobile terminal 108, which serves as a recording medium. Further, the MFPs 101 and 102, the PC 104, and the mobile terminal 108 can establish a communication connection with one another through an N/W 105. It does not matter whether the communication method is wired or wireless communication. Further, the MFPs 101 and 102 can establish a communication connection with the mobile terminal 108 using short-range wireless communication 106.

Figure 16:
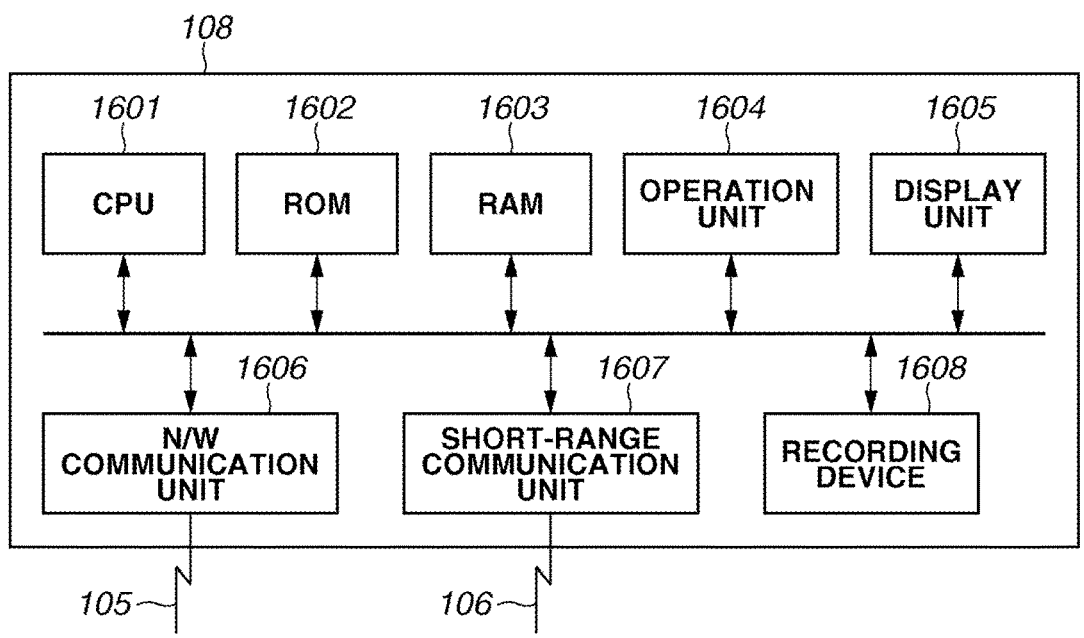
FIG. 16 is a block diagram illustrating the general configuration of a mobile terminal.

FIG. 16 is a diagram illustrating the general configuration of the mobile terminal 108. A CPU 1601 is a central processing unit that controls the entirety of the mobile terminal 108. The CPU 1601 performs overall control of the processing sequence of the mobile terminal 108. A ROM 1602 stores a print data generation program for generating print data, and fixed data. A RAM 1603 is used to temporarily save data and load the program. The print data generation program is a program having the function of converting a document file into print data, such as a printer driver. An operation unit 1604 receives a button operation and input from the user through a touch panel. A display unit 1605 includes a display such as an LCD. The display unit 1605 displays an image and text data. An N/W communication unit 1606 enables communication with an external device. A short-range communication unit 1607 includes an NFC chip. The short-range communication unit 1607 establishes a communication connection with an external device using the short-range wireless communication 106, and controls the transmission and reception of data. A recording device 1608 is a device for storing files such as document files and image files to be used to generate print data, and handover information.

Figure 17:
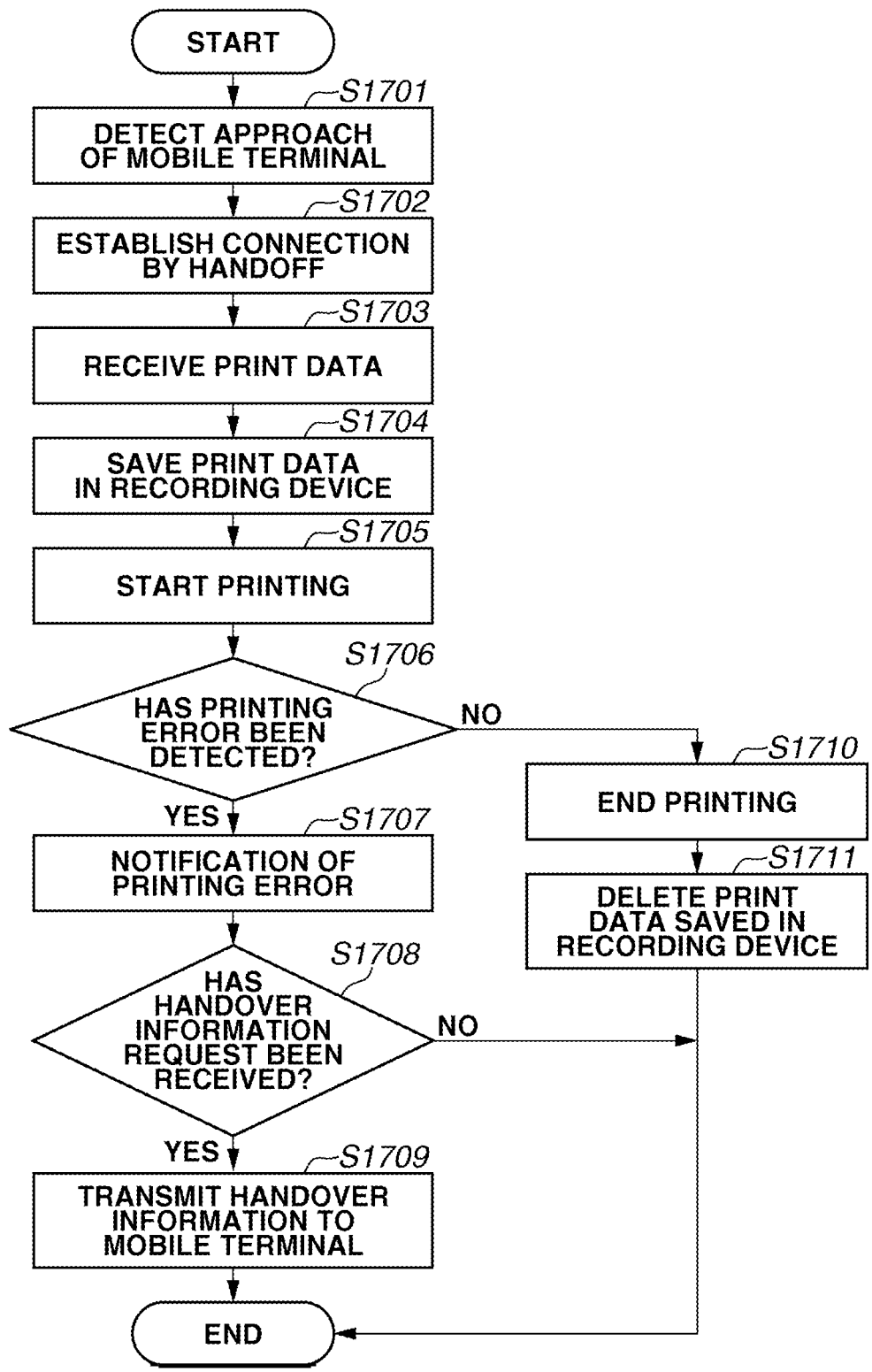
FIG. 17 is a flow chart illustrating the general processing of an MFP when an error occurs.

FIG. 17 illustrates the processing flow of the MFP 101 when a printing error occurs. In step S1701, the communication processing unit 301 of the MFP 101 detects the approach of the mobile terminal 108 via the short-range communication unit 207. In step S1702, the communication processing unit 301 establishes a short-range wireless communication connection with the mobile terminal 108 via the short-range communication unit 207, and then switches the communication method to IEEE 802.11 by handover to establish a connection. In step S1703, the communication processing unit 301 receives print data via the N/W communication unit 206. In step S1704, the device control unit 304 saves the print data received in step S1703 in the recording device 210. In step S1705, the device control unit 304 controls the print processing unit 204, thereby starting printing. In step S1706, if the device control unit 304 has detected that a printing error has occurred (YES in step S1706), the processing proceeds to step S1707. In step S1707, the communication processing unit 301 notifies the mobile terminal 108 via the N/W communication unit 206 that an error has occurred. In step S1708, if the communication processing unit 301 has received a handover information request from the mobile terminal 108 within a certain time period (YES in step S1708), the processing proceeds to step S1709. In step S1709, the handover information generation unit 305 generates handover information and records the content of the handover information in the RAM 203. When generating the handover information, the handover information generation unit 305 records, as position information to be included in the handover information, the IP address of the communication processing unit 301. Further, the handover information generation unit 305 records, as progress information to be included in the handover information, the page number of the last output page (the last page of which the output has been completed) or the page number of the page on which the error has occurred, each page number being held in the device control unit 304. Then, the communication processing unit 301 transmits the handover information to the mobile terminal 108 via the N/W communication unit 206. In step S1706, if the device control unit 304 has not detected a printing error (NO in step S1706), the processing proceeds to step S1710. In step S1710, the device control unit 304 controls the print processing unit 204 to end the printing. Then, in step S1711, the device control unit 304 deletes the print data saved in the recording device 210 in step S1704.

Figure 18:
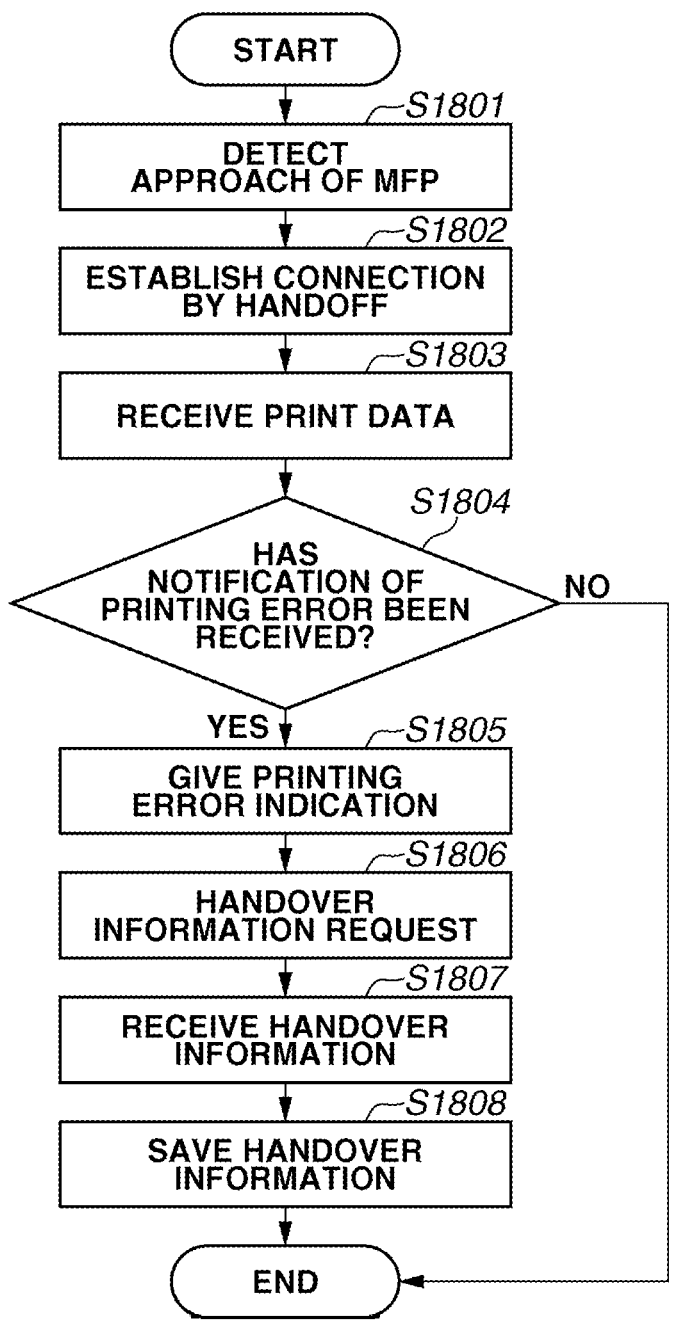
FIG. 18 is a flow chart illustrating the general processing of the mobile terminal when an error occurs.

FIG. 18 illustrates the processing flow of the mobile terminal 108 when a printing error occurs. In step S1801, the CPU 1601 of the mobile terminal 108 detects the approach of the MFP 101. In step S1802, the CPU 1601 establishes a short-range wireless communication connection with the MFP 101 via the N/W communication unit 1606, and then switches the communication method to IEEE 802.11 by handover to establish a connection. In step S1803, the CPU 1601 receives, via the operation unit 1604, user operation information for identifying a file that the user wishes to print among files such as document files saved in the recording device 1608. Then, the CPU 1601 executes the print data generation program stored in the ROM 1602, on the file identified according to the user operation information, thereby converting the identified file into print data. Then, the CPU 1601 transmits the print data to the MFP 101 via the N/W communication unit 1606. After the transmission of all print data has been completed in step S1803, then in step S1804, the CPU 1601 monitors notification of a printing error for a certain time period. If the CPU 1601 has received notification of a printing error from the MFP 101 via the N/W communication unit 1606 within the certain time period (YES in step S1804), the processing proceeds to step S1805. In step S1805, the CPU 1601 gives a printing error indication on the display unit 1605. In step S1806, the CPU 1601 transmits a handover information request to the MFP 101 via the N/W communication unit 1606. At this time, as an alternative method, the CPU 1601 may receive user operation information via the operation unit 1604, and according to the user operation information, determine whether or not to transmit a handover information request. In step S1807, the CPU 1601 receives handover information from the MFP 101 via the N/W communication unit 1606. In step S1808, the CPU 1601 saves the handover information received in step S1807 in the recording device 1608, and adds one to the number of pieces of handover information saved in the recording device 1608.

In step S1804, the following method may also be possible. The CPU 1601 receives the completion status of the printing (successful completion or an error) of each page from the MFP 101 via the N/W communication unit 1606. In this case, if the completion status of the last page indicates successful completion, the CPU 1601 ends the processing. If the CPU 1601 has received notification of an error before the successful completion of the last page, the processing proceeds to step S1805.

Figure 19:
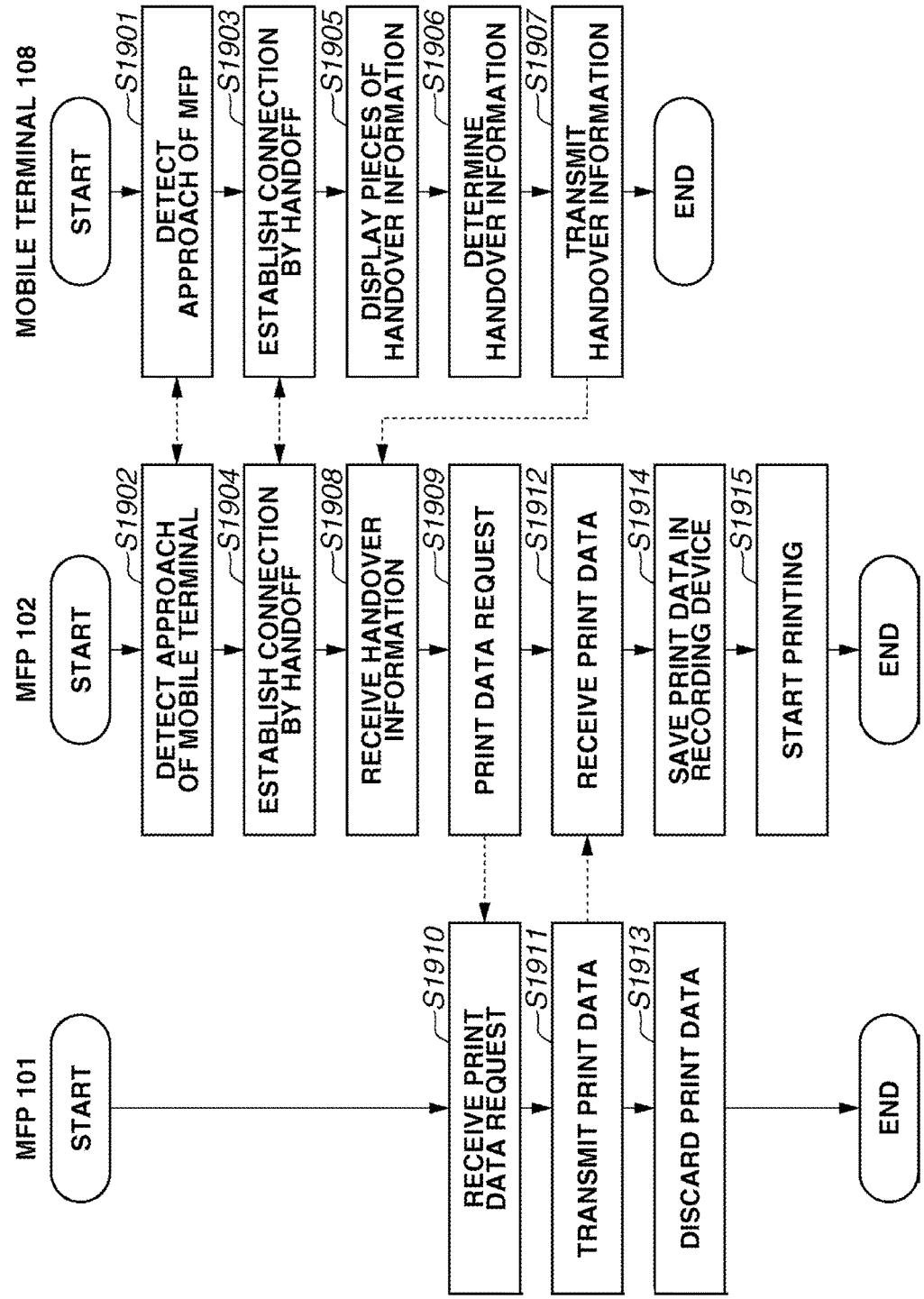
FIG. 19 is a flow chart illustrating the general processing when printing is handed over.

Finally, FIG. 19 illustrates the processing flow of the MFPs 101 and 102 and the mobile terminal 108 when printing is handed over. In step S1901, the CPU 1601 of the mobile terminal 108 detects the approach of the MFP 102. In step S1902, the communication processing unit 301 of the MFP 102 detects the approach of the mobile terminal 108 via the short-range communication unit 207. In steps S1903 and S1904, the mobile terminal 108 and the MFP 102 establish a short-range wireless communication connection with each other via the N/W communication units 1606 and 206, respectively. Then, the mobile terminal 108 and the MFP 102 switch the connection between the mobile terminal 108 and the MFP 102 from short-range wireless communication to IEEE 802.11 by handover to establish a connection with each other. In step S1905, the CPU 1601 displays on the display unit 1605 the details of the pieces of handover information saved in the recording device 1608. If handover information is not present in the recording device 1608, the processing ends without proceeding to step S1906. At this time, the CPU 1601 may give an error indication on the display unit 1605, stating that handover information is not present. In step S1906, the CPU 1601 receives user operation information via the operation unit 1604 and determines handover information based on which printing is to be taken over. If, for example, only one piece of handover information is recorded in the recording device 1608, the CPU 1601 may uniquely determine handover information without receiving an operation from the user. Further, when handover information has been determined, the CPU 1601 deletes the determined handover information from the recording device 1608 and subtracts one from the number of pieces of handover information saved in the recording device 1608. In step S1907, the CPU 1601 transmits the handover information determined in step S1906 to the MFP 102 via the N/W communication unit 206. In step S1908, the communication processing unit 301 receives the handover information from the mobile terminal 108 via the N/W communication unit 206 and records the handover information in the RAM 203. The processes of steps S1909 to S1915 are similar to the processes of steps S905 to S911 in FIG. 9, and therefore are not described here.

Figure 20:
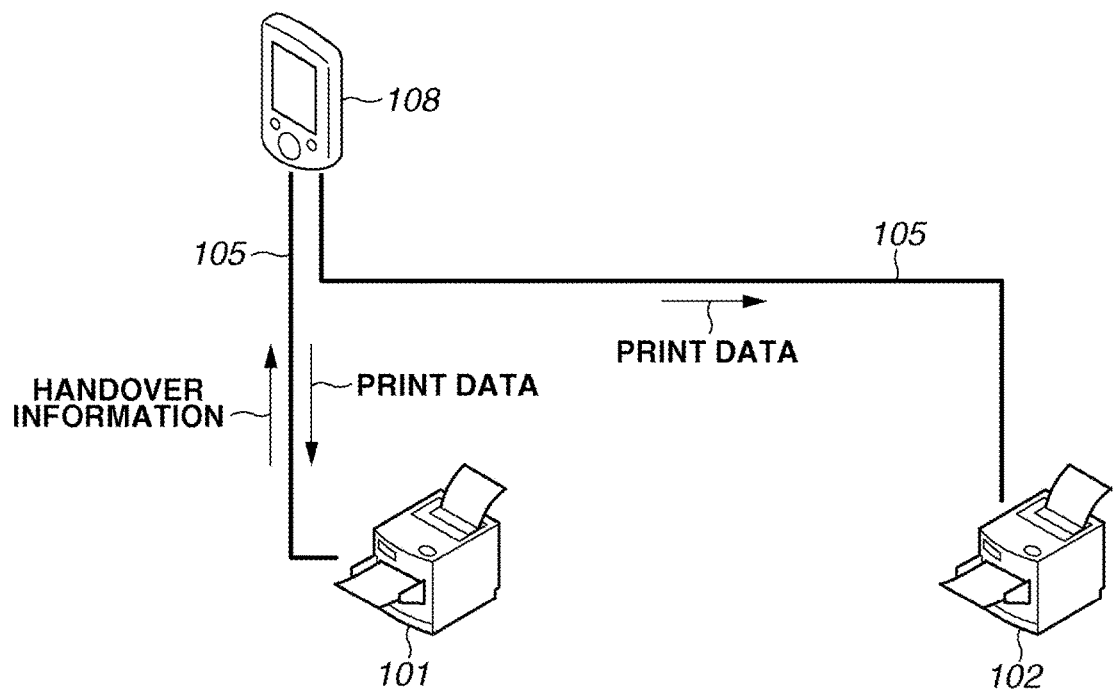
FIG. 20 is a schematic diagram illustrating the general form of an information processing system.
Figure 21:
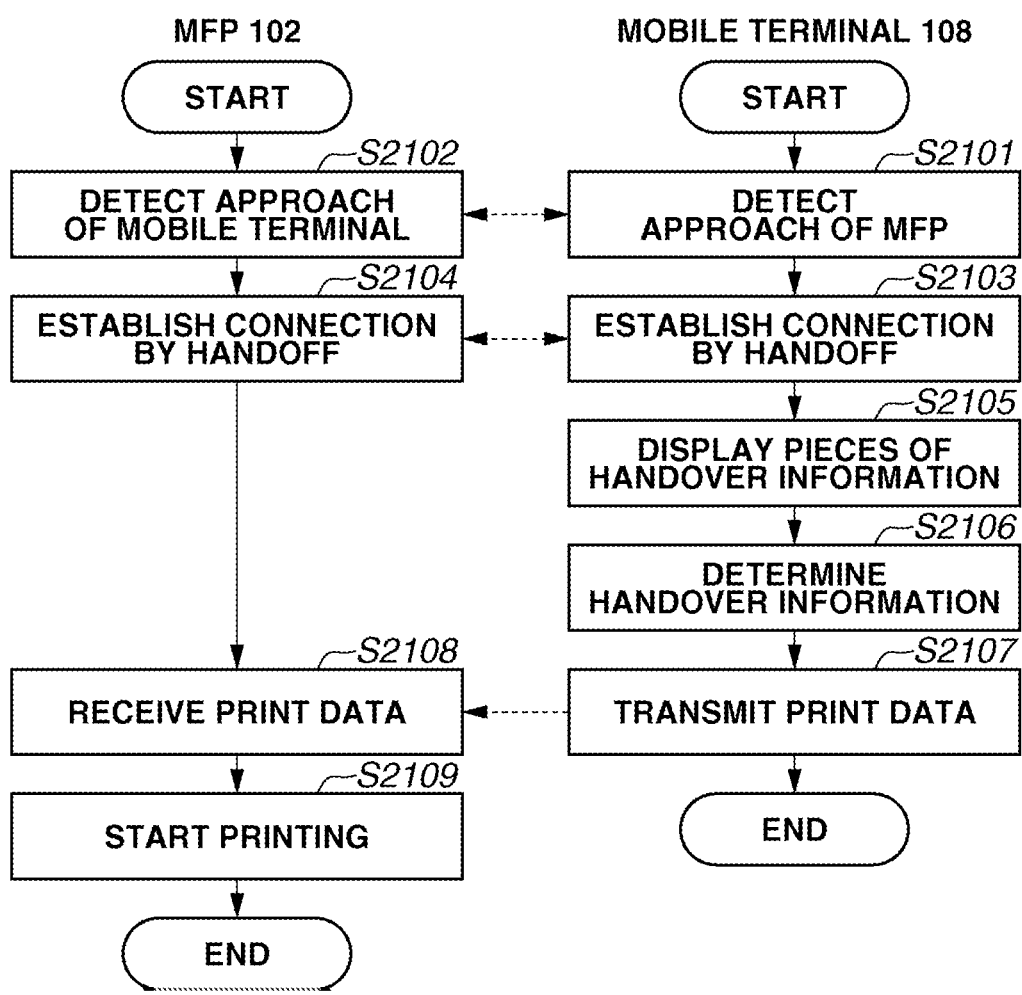
FIG. 21 is a flow chart illustrating the general processing when printing is handed over.

As illustrated in FIG. 20, print data may be input from the mobile terminal 108 instead of the PC 104. Then, when the printing is handed over, the mobile terminal 108 may retransmit the print data. The processing flow of the MFP 101 when a printing error occurs in the case of the configuration in FIG. 20 is similar to that in FIG. 17. It is, however, not necessary to save the print data in the recording device 210 (step S1704) and delete the print data from the recording device 210 (step S1711). Further, the processing flow of the mobile terminal 108 when a printing error occurs is similar to that in FIG. 18. FIG. 21 illustrates the processing flow of the MFP 102 and the mobile terminal 108 when printing is handed over. The processes of steps S2101 to S2106 are similar to the processes of steps S1901 to S1906 in FIG. 19. In step S2107, the CPU 1601 of the mobile terminal 108 refers to, as an identifier, the file name included in the print data information of the handover information determined in step S2106. Then, based on the referred-to identifier, the CPU 1601 identifies a file to be used to generate print data among files saved in the recording device 1608. Then, the CPU 1601 executes the print data generation program stored in the ROM 1602, thereby converting the identified file into print data. Then, the CPU 1601 transmits the print data to the MFP 102 via the N/W communication unit 1606. The processes of steps S2108 and S2109 are similar to the processes of steps S1912 and S1915, respectively, in FIG. 19.

As described above, according to the present exemplary embodiment, the user can intuitively hand over a process of the MFP 101 that is the handover source to the MFP 102 that is the handover destination, by sequentially touching the MFPs 101 and 102 with the mobile terminal 108 to establish communication.

In a third exemplary embodiment, an example is described where a PC 109, as a handover source, a PC 110 as a handover destination, and a contactless IC card 103, hand over the reproduction of a moving image or the reproduction of a sound (a process of reproducing audio data) according to short-range wireless communication. The description is given in two parts: the time when the handover is set; and the time when the handover is performed. The following description is given mainly of the reproduction of a moving image for ease of description.

Figure 22:
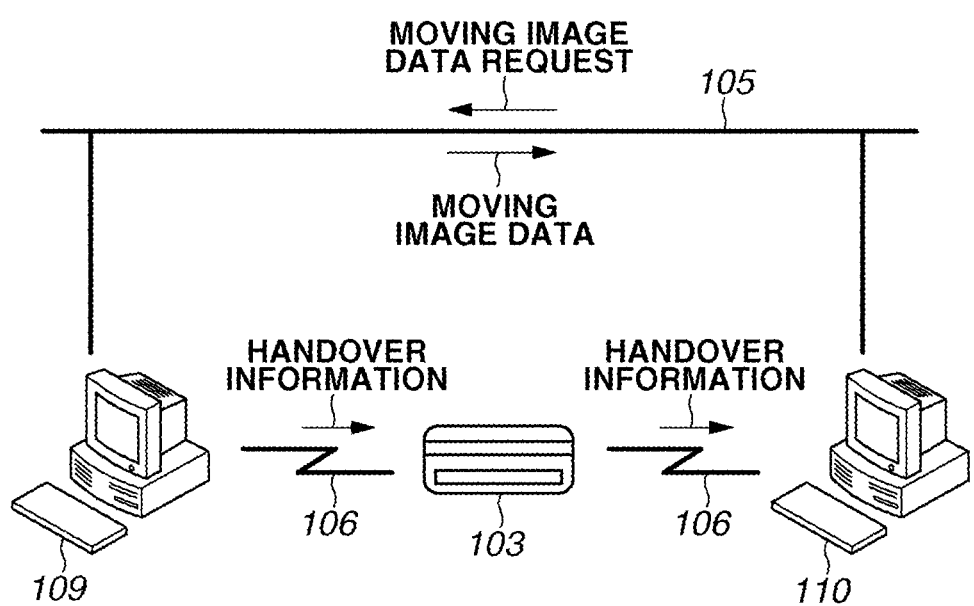
FIG. 22 is a schematic diagram illustrating the general form of an information processing system.

FIG. 22 is a diagram illustrating the general configuration of an information processing system according to the third exemplary embodiment. The system includes: PCs 109 and 110, which serve as information processing terminals; and a contactless IC card 103, which serves as a recording medium. The information processing terminals may be replaced with terminal apparatuses such as smartphones and tablets, instead of PCs. Further, the PCs 109 and 110 can establish a communication connection with each other through an N/W 105. It does not matter whether the communication method is wired or wireless communication. Further, the PCs 109 and 110 can establish a communication connection with the contactless IC card 103 using short-range wireless communication 106.

The general configurations of the PCs 109 and 110 are similar to the general configuration of the PC 104 in FIG. 6, except that each of the PCs 109 and 110 additionally includes a short-range communication unit 608. The short-range communication unit 608 includes an NFC chip. The short-range communication unit 608 establishes a communication connection with an external device using the short-range wireless communication 106, and controls the transmission and reception of data.

In the present exemplary embodiment, a memory map of the non-volatile storage area included in the IC chip 403 is almost similar to that in FIG. 5 in the first exemplary embodiment. The present exemplary embodiment, however, is different from the first exemplary embodiment in the details of the data information 505, the position information 506, the progress information 507, and the setting information 508 included in each of handover information 504. In the present exemplary embodiment, the data information 505 is information that serves as an identifier for uniquely identifying moving image data, such as the name of the moving image data. The position information 506 is information such as the IP address and the MAC address of an apparatus that is a destination for saving the moving image data. The progress information 507 is information indicating the progress state of the reproduction of a moving image, such as the elapsed time from the beginning of the moving image when a request to hand over the reproduction of the moving image has been made, a reproduction time, and chapter information. The setting information 508 includes information applied when the reproduction of a moving image is handed over, such as the sound volume, the screen size (the angle of view), the caption setting, and the sound setting (including the bilingual setting).

Figure 23:
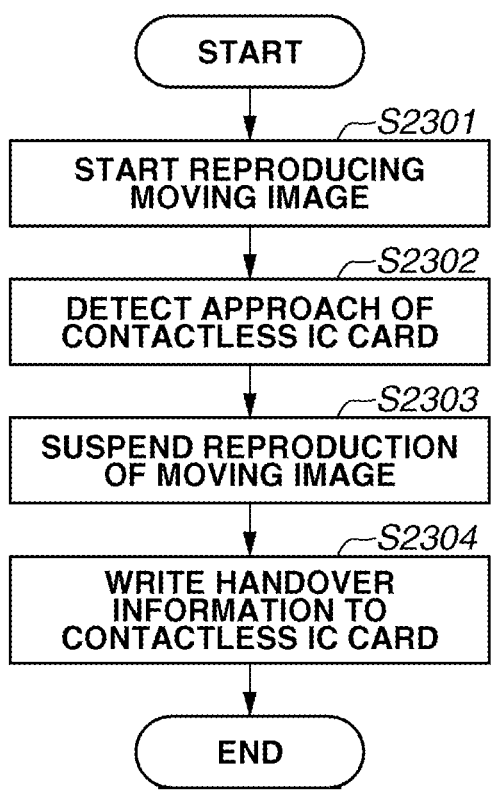
FIG. 23 is a flow chart illustrating the general processing when the handover of the reproduction of a moving image is set.

FIG. 23 illustrates the processing flow of the PC 109 when the handover of the reproduction of a moving image is set. In step S2301, the CPU 601 of the PC 109 receives operation information requesting the reproduction of a moving image via the operation unit 605. Then, based on the operation information, the CPU 601 determines moving image data to be reproduced among pieces of moving image data saved in the recording device 607. Then, the CPU 601 starts reproducing the moving image via the display unit 606. In step S2302, the CPU 601 detects the approach of the contactless IC card 103 to the short-range communication unit 608. In step S2303, the CPU 601 controls the display unit 606 to suspend the reproduction of the moving image. In step S2304, the CPU 601 generates handover information. When generating the handover information, the CPU 601 records, as moving image data information to be included in the handover information, the file name of the moving image data of which the reproduction has been suspended. Further, the CPU 601 records, as position information to be included in the handover information, the IP address of the PC 109 managed by the CPU 601. Further, the CPU 601 records, as progress information to be included in the handover information, the elapsed time from the beginning of the moving image when the reproduction of the moving image has been suspended in step S2302. Further, the CPU 601 records, as setting information to be included in the handover information, the setting information when the reproduction of the moving image has been suspended. Then, the CPU 601 reads the number of pieces of handover information from the contactless IC card 103, adds one to the read value, and records the resulting value in the RAM 603 along with the generated handover information. Then, the CPU 601 operates the contactless IC card 103 in the R/W mode via the short-range communication unit 608 and writes the number of pieces of handover information and the handover information to the available area 502 of the IC chip 403.

FIG. 24 illustrates the processing flow of the PCs 109 and 110 when the reproduction of a moving image is handed over. In step S2401, the CPU 601 of the PC 110 detects the approach of the contactless IC card 103 to the short-range communication unit 608. In step S2402, the CPU 601 operates the contactless IC card 103 in the R/W mode via the short-range communication unit 608, reads the number of pieces of handover information 503 and the handover information 504 recorded in the available area 502 of the IC chip 403, and records the number of pieces of handover information and the handover information in the RAM 603. If the handover information is not saved in the contactless IC card 103, the processing ends without proceeding to step S2403. In step S2403, the CPU 601 displays the details of the handover information on the display unit 606 for presentation to the user. In step S2404, the CPU 601 receives user operation information via the operation unit 605 and determines handover information based on which the reproduction of a moving image is to be taken over. If, for example, only one piece of handover information is recorded in the contactless IC card 103, the CPU 601 may uniquely determine handover information without receiving an operation from the user. When the handover information has been determined, the CPU 601 deletes the determined handover information from the contactless IC card 103. In step S2405, the CPU 601 refers to the moving image data information and the position information included in the handover information determined in step S2404, and transmits a moving image data request including the moving image data information to a target indicated by the position information (the PC 109 in the present exemplary embodiment) via the N/W communication unit 604. In step S2406, the CPU 601 of the PC 109 receives the moving image data request via the N/W communication unit 604 and records the content of the moving image data request in the RAM 603. In step S2407, the CPU 601 refers to, as an identifier, the file name included in the moving image data information received from the PC 110. Then, based on the referred-to identifier, the CPU 601 identifies corresponding moving image data among the moving image data saved in the recording device 607. Then, the CPU 601 transmits the moving image data identified via the N/W communication unit 604 to the PC 110, which is the request source of the moving image data. In step S2408, the CPU 601 receives the moving image data from the PC 109 via the N/W communication unit 604. In step S2409, the CPU 601 saves the moving image data received in step S2408 in the recording device 607. In step S2410, the CPU 601 refers to, via the display unit 606, the progress information included in the handover information determined in step S2404, thereby starting to reproduce the moving image from the time elapsed from the beginning of the moving image indicated by the progress information. At this time, the CPU 601 refers to the setting information included in the determined handover information, and reproduces the moving image according to the setting information.

In step S2410, if the handover information determined in step S2403 includes setting information with which the PC 110 is not compatible, the PC 110 ignores the information and reproduces the moving image by the functions of the PC 110. For example, if the PC 110 that is the handover destination is not compatible with the specified screen size, the PC 110 reproduces the moving image at a screen size which the PC 110 can handle. Alternatively, the PC 110 may give an error indication on the display unit 606 without reproducing the moving image. Yet alternatively, the PC 110 may give an error indication on the display unit 606, thereby prompting the user to determine whether or not to reproduce the moving image via the operation unit 605.

In the present exemplary embodiment, moving image data is received from the PC 109. Alternatively, the moving image data may be received from a video broadcasting site on the Internet. In this case, in step S2304, the CPU 601 records an URL on the Internet as position information to be included in the handover information. Further, in the present exemplary embodiment, the PCs 109 and 110 may include a sound processing apparatus such as a loudspeaker in addition to the general configuration in FIG. 6, and may take over sound volume information as the setting information included in the handover information.

In the reproduction of a moving image or the reproduction of a sound, if the moving image or the sound is reproduced at the handover destination, from the point at which the user has instructed the handover at the handover source, information may lack. Accordingly, the handover information may include a point obtained by going back a predetermined time further from the point at which the user has instructed the handover at the handover source. Alternatively, the moving image or the sound may be reproduced at the handover destination from a point obtained by going back a predetermined time further from the elapsed time included in the handover information. Also in the reproduction of a moving image or the reproduction of a sound, the handover source and the handover destination may be the same apparatus. In this case, the process is similar to a suspend process for the user. It is considered that the lessening of a processing load of the handover source leads to a more desirable operability for the user who is executing the handover as a suspending process. Thus, the time of the reproduction start may go back, not at the handover source side but at the handover destination side.

As described above, according to the present exemplary embodiment, the user can intuitively hand over a process of the PC 109 that is the handover source to the PC 110 that is the handover destination, by sequentially touching the PCs 109 and 110 with the contactless IC card 103 to establish communication. That is, according to the present exemplary embodiment, the user can intuitively hand over a process of an information processing apparatus.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2013-053602 filed Mar. 15, 2013, which is hereby incorporated by reference herein in its entirety.

What is claimed is:

1. An information processing apparatus comprising:
a generation unit, implemented by one or more processors, configured to generate handover information, wherein the handover information includes position information indicating a saving location for data that is being processed, progress information indicating a state of the process of the data, and setting information indicating a setting related to the process of the data; and
an output unit, implemented by the one or more processors, configured to, according to establishment of short-range wireless communication with a wireless communication apparatus, output the handover information to the wireless communication apparatus,
wherein the position information indicates a saving location of moving image data or audio data to be subjected to a reproduction process, the progress information indicates a state of progress of the reproduction process, the setting information indicates a setting of reproduction of a moving image when a handover request to hand over the reproduction of the moving image has been made, and the generation unit generates the handover information in response to the handover request, wherein the handover information is receivable by another information processing apparatus from the wireless communication apparatus using short-range wireless communication.

2. The information processing apparatus according to claim 1, wherein the progress information is a time elapsed from a beginning of the moving image or a sound.

3. An information processing apparatus comprising:
a processing unit, implemented by one or more processors, configured to process data;
a first communication unit, implemented by the one or more processors, configured to execute short-range wireless communication to start communication when a distance between the information processing apparatus and a wireless communication apparatus becomes less than or equal to a threshold distance value;

a second communication unit, implemented by the one or more processors and different from the first communication unit, configured to communicate the data;

a transmission unit, implemented by the one or more processors, configured to transmit first information including address information for communicating with the information processing apparatus to the wireless communication apparatus, using the first communication unit, in a case where communication with the wireless communication apparatus is started by the first communication unit and an error occurs during processing of the data by the processing unit; and a transfer unit, implemented by the one or more processors, configured to, in a case where another information processing apparatus that acquires the first information by short-range wireless communication with the wireless communication apparatus requests the data in communication addressed to the address information after the first information is transmitted by the transmission unit, transfer the data to the another information processing apparatus, using the second communication unit, so that the another information processing apparatus processes the data.

4. The information processing apparatus according to claim 3, wherein the processing unit is configured to execute print processing for printing the data.

5. The information processing apparatus according to claim 4, wherein the first information to be transmitted by the transmission unit includes information on a page of the data, and an error that occurs during print processing by the processing unit.

6. The information processing apparatus according to claim 4, wherein the first information to be transmitted by the transmission unit includes information on a page of the data before being processed by the another information processing apparatus.

7. The information processing apparatus according to claim 3, wherein the first information to be transmitted by the transmission unit includes information on print setting for printing the data.

8. An information processing apparatus comprising:

a first communication unit, implemented by one or more processors, configured to execute short-range wireless communication to start communication when a distance between the information processing apparatus and a wireless communication apparatus becomes less than or equal to a threshold distance value;

a second communication unit, implemented by the one or more processors and different from the first communication unit;

a reception unit, implemented by the one or more processors, configured to receive first information indicating a data processing request from another information processing apparatus and including address information for communicating with the another information processing apparatus from the wireless communication apparatus, using the first communication unit, in a case where communication with the wireless communication apparatus is started by the first communication unit, wherein the first information having been received by the wireless communication apparatus from the another information processing apparatus using short-range wireless communication; and an acquisition unit, implemented by the one or more processors, configured to request using the address information and acquire the data from the another information processing apparatus according to the request, using the second communication unit, after the first information is received by the reception unit; and a processing unit, implemented by the one or more processors, configured to process the data acquired by the acquisition unit.

9. The information processing apparatus according to claim 8, wherein the processing unit is configured to execute print processing for printing the data.

10. The information processing apparatus according to claim 8, wherein the first information to be received by the reception unit includes information on a page in the data from which printing is started, and wherein the processing unit is configured to control the page in the data from which printing is started based on the information on the page.

11. The information processing apparatus according to claim 8, wherein the first information to be received by the reception unit includes information on print settings for printing the data, and wherein the processing unit is configured to print the data based on the information on the print setting.

12. A method of controlling an information processing apparatus, the method comprising:

executing, by a first communication unit, short-range wireless communication to start communication between the information processing apparatus and a wireless communication apparatus when a distance therebetween becomes less than or equal to a threshold distance value;

transmitting first information including address information for communicating with the information processing apparatus to the wireless communication apparatus, using the first communication unit, in a case where communication with the wireless communication apparatus is started by the first communication unit and an error occurs during processing of data;

transferring, in a case where another information processing apparatus that acquires the first information by short-range wireless communication with the wireless communication apparatus requests the data in communication addressed to the address information after the first information is transmitted, the data to the another information processing apparatus, using a second communication unit different from the first communication unit, so that the another information processing apparatus processes the data.

13. A non-transitory computer readable storage medium storing instructions that, when executed by one or more processors, causes a computer to execute the method according to claim 12.

14. A method of controlling an information processing apparatus, the method comprising:

executing, via a first communication unit, short-range wireless communication to start communication between the information processing apparatus and a wireless communication apparatus when a distance therebetween becomes less than or equal to a threshold distance value;

receiving first information indicating a data processing request from another information processing apparatus and including address information for communicating with the another information processing apparatus from the wireless communication apparatus, using the first communication unit, in a case where communication with the wireless communication apparatus is started by the first communication unit, wherein the first information having been received by the wireless communication apparatus from the another information processing apparatus using short-range wireless communication; and requesting data using the address information and acquiring the data from the another information processing apparatus according to the request, using a second communication unit different from the first communication unit, after the first information is received; and processing the data acquired via the second communication unit from the another information processing apparatus.

15. A non-transitory computer readable storage medium storing instructions that, when executed by one or more processors, causes a computer to execute the method according to claim 14.

16. An information processing apparatus comprising:
a reproduction unit, implemented by one or more processors, configured to reproduce a moving image;
a communication unit, implemented by one or more processors, configured to execute short-range wireless communication in which communication is automatically started in a case where a distance between the information processing apparatus and a wireless communication apparatus becomes shorter than a predetermined distance;
a generation unit, implemented by the one or more processors, configured to, in response to starting of communication by the communication unit while the moving image is being reproduced by the reproduction unit, generate information indicating a reproduction position based on progress of reproducing the moving image by the reproduction unit;
a transmission unit, implemented by the one or more processors, configured to transmit the information indicating the reproduction position to the wireless communication apparatus; and
wherein the information transmitted by the transmission unit enables another information processing apparatus that has acquired the information from the wireless communication apparatus using short range wireless communication to reproduce the moving image from the reproduction position indicated in the information without reproducing the moving image from a beginning of the moving image.

17. The information processing apparatus according to claim 16, wherein the information to be transmitted by the transmission unit includes information for specifying the moving image.

18. The information processing apparatus according to claim 16, wherein the information to be transmitted by the transmission unit includes address information for acquiring the moving image.

19. The information processing apparatus according to claim 16, further comprising a transfer unit, implemented by the one or more processors, configured to transfer the moving image after the information is transmitted by the transmission unit.

20. The information processing apparatus according to claim 16, further comprising a transfer unit, implemented by the one or more processors, configured to, in a case where the another information processing apparatus requests the moving image after the information is transmitted by the transmission unit, transfer the moving image to the other information processing apparatus.

21. The information processing apparatus according to claim 16, wherein the reproduction position based on progress of reproducing the moving image by the reproduction unit when the communication is started by the communication unit is a reproduction position based on timing when reproducing the moving image data by the reproduction unit is suspended.

22. The information processing apparatus according to claim 16, wherein the short-range wireless communication is Near Field Communication.

23. The information processing apparatus according to claim 16 wherein the predetermined distance is shorter than 10 cm.

24. A method of controlling an information processing apparatus, the method comprising:
reproducing a moving image;
executing short-range wireless communication via a communication unit, the communication automatically being started in a case where a distance between the information processing apparatus and a wireless communication apparatus becomes shorter than a predetermined distance;
generating, in response to starting of communication while the moving image is being reproduced, information indicating a reproduction position based on progress of reproducing the moving image;
transmitting the information indicating the reproduction position based on progress of reproducing the moving image to the wireless communication apparatus; and
wherein the information transmitted enables another information processing apparatus that has acquired the information from the wireless communication apparatus using short-range wireless communication to reproduce the moving image from the reproduction position indicated in the information without reproducing the moving image from a beginning of the moving image.

25. A non-transitory computer readable storage medium storing instructions that, when executed by one or more processors, causes a computer to execute the method according to claim 24.

* * * * *